United States Patent
Venkatram et al.

(10) Patent No.: US 11,277,831 B2
(45) Date of Patent: Mar. 15, 2022

(54) ON DEMAND SYSTEM INFORMATION TRIGGERING

(71) Applicant: QUALCOMM Incorporated, San Diego, CA (US)

(72) Inventors: Karthik Venkatram, San Diego, CA (US); Daniel Amerga, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 66 days.

(21) Appl. No.: 16/789,282

(22) Filed: Feb. 12, 2020

(65) Prior Publication Data
US 2020/0267721 A1    Aug. 20, 2020

Related U.S. Application Data

(60) Provisional application No. 62/805,947, filed on Feb. 14, 2019.

(51) Int. Cl.
*H04W 72/04* (2009.01)
*H04W 74/08* (2009.01)
(Continued)

(52) U.S. Cl.
CPC ....... *H04W 72/0426* (2013.01); *H04W 48/12* (2013.01); *H04W 48/14* (2013.01);
(Continued)

(58) Field of Classification Search
None
See application file for complete search history.

(56) References Cited

U.S. PATENT DOCUMENTS

| 10,856,214 B2 * | 12/2020 | Ingale | H04W 48/20 |
| 2018/0270866 A1 * | 9/2018 | Loehr | H04W 72/1289 |

(Continued)

FOREIGN PATENT DOCUMENTS

| EP | 3413632 A1 | 12/2018 |
| WO | WO-2018082494 A1 | 5/2018 |

OTHER PUBLICATIONS

Huawei et al., "Discussion on RA procedure for msg1-based on-demand SI request", 3GPP TSG-RAN WG2 Meeting AH 1807, 3GPP Draft; R2-1810002 Discussion on RA Procedure for Ondemand Si Request, 3rd Generation Partnership Project (3GPP),Mobile Competence Centre ; 650, Route Des Lucioles ; F-06921 SophiaAntipolis Ced, vol. RAN WG2, No. Montreal, Canada; Jul. 2, 2018-Jul. 6, 2018 Jul. 1, 2018 (Jul. 1, 2018), 9 Pages, XP051467237, Retrieved from the Internet: URL:http://www.3gpp.org/ftp/Meetings%5F3GPP%5FSYNC/RAN2/Docs [retrieved on Jul. 1, 2018].

(Continued)

*Primary Examiner* — Jutai Kao
(74) *Attorney, Agent, or Firm* — Holland & Hart LLP

(57) ABSTRACT

Methods, systems, and devices for wireless communication are described. For example, the described techniques provide for efficiently requesting all (or a threshold number of) system information (SI) messages that are on demand in a random access channel (RACH) procedure. In one example, a user equipment (UE) may transmit a request for all (or a threshold number of) SI messages in a radio resource control (RRC) connection request or message 3 RACH transmission even if the UE is configured with the option to request SI messages individually with one RACH resource per SI message. In another example, a UE may transmit a request for all (or a threshold number of) SI messages on an additional resource (e.g., RACH resource or other resource configured by a base station) when the UE is configured with (Continued)

the option to request SI messages individually with one RACH resource per SI message.

30 Claims, 17 Drawing Sheets

(51) Int. Cl.
*H04W 48/12* (2009.01)
*H04W 48/14* (2009.01)
*H04W 74/00* (2009.01)
*H04W 48/10* (2009.01)

(52) U.S. Cl.
CPC ....... *H04W 72/042* (2013.01); *H04W 74/002* (2013.01); *H04W 74/0833* (2013.01); *H04W 48/10* (2013.01)

(56) References Cited

U.S. PATENT DOCUMENTS

| | | |
|---|---|---|
| 2018/0323908 A1 | 11/2018 | Chou |
| 2019/0268922 A1 | 8/2019 | He et al. |
| 2021/0136770 A1* | 5/2021 | Nakashima ............... H04L 5/00 |
| 2021/0168851 A1* | 6/2021 | Kim .................. H04W 74/0833 |

OTHER PUBLICATIONS

International Search Report and Written Opinion—PCT/US2020/018164—ISA/EPO—dated Jul. 3, 2020 (191580WO).
Panasonic: "Remaining issues on the MSG3 based on-demand SI request", 3GPP TSG-RAN WG2 #1 02, 3GPP Draft; R2-1807161 Remaining Issues on the MSG3 Based Ondemand Si Request, 3rd Generation Partnership Project (3GPP), Mobile Competence Centre ; 650, Route Des Lucioles ; F-06921 SophiaAntipolis, vol. RAN WG2, No. Busan, Korea; May 21, 2018-May 25, 2018 May 20, 2018 (May 20, 2018), pp. 1-4, XP051443574, Retrieved from the Internet: URL: http://www.3gpp.org/ftp/Meetings%5F3GPP%5FSYNC/RAN2/Docs/ [retrieved on May 20, 2018].

* cited by examiner

ON DEMAND SYSTEM INFORMATION TRIGGERING

CROSS REFERENCE

The present Application for patent claims the benefit of U.S. Provisional Patent Application No. 62/805,947 by VENKATRAM et al., entitled "ON DEMAND SYSTEM INFORMATION TRIGGERING," filed Feb. 14, 2019, assigned to the assignee hereof, and expressly incorporated by reference in its entirety herein.

BACKGROUND

The following relates to wireless communications, and more specifically to on demand system information (SI) triggering.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a UE may use a random access channel (RACH) procedure to establish a connection with a base station or identify suitable parameters and configurations for communicating with the base station. In some cases, as part of the RACH procedure, it may be appropriate for the UE to request one or more SI messages from a base station. Conventional techniques for requesting SI messages from a base station, however, may be deficient.

SUMMARY

The described techniques relate to improved methods, systems, devices, and apparatuses that support on demand system information (SI) triggering. For instance, the described techniques provide for efficiently requesting all SI messages that are on demand in a random access channel (RACH) procedure. In one example, if a user equipment (UE) is configured with the option to request SI messages individually with one RACH resource per SI message, and the UE decides to request all, or a threshold number of, SI messages that are on demand, the UE may request the SI messages in a message 3 RACH transmission. In another example, if a UE is configured with the option to request SI messages individually with one RACH resource per SI message, the UE may also be configured with at least one additional resource (e.g., RACH resource or other resource) for requesting all SI messages. In this example, if the UE decides to request all SI messages that are on demand, the UE may request the SI messages using the additional resource.

A method of wireless communications at a UE is described. The method may include receiving, from a base station, an indication of on demand SI resources including a first set of resources associated with a first on demand SI message supported by the base station and a second set of resources associated with a second on demand SI message supported by the base station and transmitting a SI request message to the base station in response to the receiving, the SI request message including a request for transmission of a set of on demand SI messages.

An apparatus for wireless communications at a UE is described. The apparatus may include a processor, memory in electronic communication with the processor, and instructions stored in the memory. The instructions may be executable by the processor to cause the apparatus to receive, from a base station, an indication of on demand SI resources including a first set of resources associated with a first on demand SI message supported by the base station and a second set of resources associated with a second on demand SI message supported by the base station and transmit a SI request message to the base station in response to the receiving, the SI request message including a request for transmission of a set of on demand SI messages.

Another apparatus for wireless communications at a UE is described. The apparatus may include means for receiving, from a base station, an indication of on demand SI resources including a first set of resources associated with a first on demand SI message supported by the base station and a second set of resources associated with a second on demand SI message supported by the base station and transmitting a SI request message to the base station in response to the receiving, the SI request message including a request for transmission of a set of on demand SI messages.

A non-transitory computer-readable medium storing code for wireless communications at a UE is described. The code may include instructions executable by a processor to receive, from a base station, an indication of on demand SI resources including a first set of resources associated with a first on demand SI message supported by the base station and a second set of resources associated with a second on demand SI message supported by the base station and transmit a SI request message to the base station in response to the receiving, the SI request message including a request for transmission of a set of on demand SI messages.

Some examples of the method, apparatuses, and non-transitory computer-readable medium described herein may further include operations, features, means, or instructions for identifying a number of sets of resources associated with on demand SI based on the indication of on demand SI resources, and transmitting the SI request message via a random access message 3 based on the number of sets of resources exceeding a threshold.

Some examples of the method, apparatuses, and non-transitory computer-readable medium described herein may further include operations, features, means, or instructions for transmitting the SI request message via a random access message 3, where the SI request message includes a request for transmission of all on demand SI messages.

Some examples of the method, apparatuses, and non-transitory computer-readable medium described herein may further include operations, features, means, or instructions for transmitting the SI request message via a random access message 3, where the SI request message includes a bitmap indicating the set of on demand SI messages.

Some examples of the method, apparatuses, and non-transitory computer-readable medium described herein may further include operations, features, means, or instructions for identifying a number of sets of resources associated with on demand SI based on the indication of on demand SI resources, and transmitting the SI request message via a random access message 1.

In some examples of the method, apparatuses, and non-transitory computer-readable medium described herein, the indication of on demand SI resources includes a list of resource configurations for on demand SI messages.

Some examples of the method, apparatuses, and non-transitory computer-readable medium described herein may further include operations, features, means, or instructions for determining that a number of resource configurations in the list exceeds a threshold, and transmitting the SI request message including a request for all on demand SI messages according to an initial resource configuration in the list.

Some examples of the method, apparatuses, and non-transitory computer-readable medium described herein may further include operations, features, means, or instructions for determining that a number of resource configurations in the list exceeds a threshold, and transmitting the SI request message including a request for all on demand SI messages according to a last resource configuration in the list.

In some examples of the method, apparatuses, and non-transitory computer-readable medium described herein, receiving the indication of on demand SI resources may include operations, features, means, or instructions for receiving a SI block 1 (SIB1) message including the indication of on demand SI resources.

Some examples of the method, apparatuses, and non-transitory computer-readable medium described herein may further include operations, features, means, or instructions for receiving SI scheduling information via the SIB1 message, where the indication of on demand SI resources may be conveyed via the SI scheduling information.

Some examples of the method, apparatuses, and non-transitory computer-readable medium described herein may further include operations, features, means, or instructions for identifying a set of resource indicators associated with the on demand SI resources based on the SIB1 message.

In some examples of the method, apparatuses, and non-transitory computer-readable medium described herein, each of the set of resource indicators corresponds to a respective on demand SI message supported by the base station.

In some examples of the method, apparatuses, and non-transitory computer-readable medium described herein, an initial resource indicator or a last resource indicator of the set of resource indicators corresponds to all on demand SI messages supported by the base station.

In some examples of the method, apparatuses, and non-transitory computer-readable medium described herein, an initial resource indicator or a last resource indicator of the set of resource indicators corresponds to the second set of resources.

In some examples of the method, apparatuses, and non-transitory computer-readable medium described herein, a first resource indicator of the set of resource indicators corresponds to a first subset of on demand SI messages supported by the base station, and a second resource indicator of the set of resource indicators corresponds to a second subset of on demand SI messages supported by the base station.

In some examples of the method, apparatuses, and non-transitory computer-readable medium described herein, the set of on demand SI messages includes all on demand SI messages supported by the base station including the first and second on demand SI messages.

In some examples of the method, apparatuses, and non-transitory computer-readable medium described herein, the SI request message may be transmitted via the first set of resources, the second set of resources, or a third set of resources different from the first and second sets of resources.

In some examples of the method, apparatuses, and non-transitory computer-readable medium described herein, the first and second sets of resources include random access resources.

In some examples of the method, apparatuses, and non-transitory computer-readable medium described herein, the first and second sets of resources exclude random access resources.

A method of wireless communications at a base station is described. The method may include configuring a set of resources for on demand SI, the set of resources including a first set of resources associated with a first on demand SI message supported by the base station and a second set of resources associated a set of on demand SI messages supported by the base station, transmitting an indication of the set of resources configured for on demand SI, and receiving a SI request message from a UE in response to the transmitting, the SI request message including a request for transmission of one or more on demand SI messages.

An apparatus for wireless communications at a base station is described. The apparatus may include a processor, memory in electronic communication with the processor, and instructions stored in the memory. The instructions may be executable by the processor to cause the apparatus to configure a set of resources for on demand SI, the set of resources including a first set of resources associated with a first on demand SI message supported by the base station and a second set of resources associated a set of on demand SI messages supported by the base station, transmit an indication of the set of resources configured for on demand SI, and receive a SI request message from a UE in response to the transmitting, the SI request message including a request for transmission of one or more on demand SI messages.

Another apparatus for wireless communications at a base station is described. The apparatus may include means for configuring a set of resources for on demand SI, the set of resources including a first set of resources associated with a first on demand SI message supported by the base station and a second set of resources associated a set of on demand SI messages supported by the base station, transmitting an indication of the set of resources configured for on demand SI, and receiving a SI request message from a UE in response to the transmitting, the SI request message including a request for transmission of one or more on demand SI messages.

A non-transitory computer-readable medium storing code for wireless communications at a base station is described. The code may include instructions executable by a processor to configure a set of resources for on demand SI, the set of resources including a first set of resources associated with a first on demand SI message supported by the base station and a second set of resources associated a set of on demand SI messages supported by the base station, transmit an indication of the set of resources configured for on demand SI, and receive a SI request message from a UE in response to the transmitting, the SI request message including a request for transmission of one or more on demand SI messages.

Some examples of the method, apparatuses, and non-transitory computer-readable medium described herein may further include operations, features, means, or instructions for transmitting a list of resource configurations for on demand SI messages, where an initial resource configuration in the list or a last resource configuration in the list may be associated with resources for all on demand SI message supported by the base station.

Some examples of the method, apparatuses, and non-transitory computer-readable medium described herein may further include operations, features, means, or instructions for including the list of resource configurations in the indication of the set of resources.

Some examples of the method, apparatuses, and non-transitory computer-readable medium described herein may further include operations, features, means, or instructions for transmitting the indication of the set of resources via a SIB1 message.

Some examples of the method, apparatuses, and non-transitory computer-readable medium described herein may further include operations, features, means, or instructions for transmitting SI scheduling information via the SIB1 message, where the indication of on demand SI resources may be conveyed via the SI scheduling information.

Some examples of the method, apparatuses, and non-transitory computer-readable medium described herein may further include operations, features, means, or instructions for including a set of resource indicators associated with the on demand SI resources in the SIB1 message.

In some examples of the method, apparatuses, and non-transitory computer-readable medium described herein, each of the set of resource indicators corresponds to a respective on demand SI message supported by the base station.

In some examples of the method, apparatuses, and non-transitory computer-readable medium described herein, an initial resource indicator or a last resource indicator of the set of resource indicators corresponds to all on demand SI messages supported by the base station.

In some examples of the method, apparatuses, and non-transitory computer-readable medium described herein, an initial resource indicator or a last resource indicator of the set of resource indicators corresponds to the second set of resources.

In some examples of the method, apparatuses, and non-transitory computer-readable medium described herein, a first resource indicator of the set of resource indicators corresponds to a first subset of on demand SI messages supported by the base station, and a second resource indicator of the set of resource indicators corresponds to a second subset of on demand SI messages supported by the base station.

In some examples of the method, apparatuses, and non-transitory computer-readable medium described herein, configuring the set of resources may include operations, features, means, or instructions for configuring a set of random access resources as the first set of resources and the second set of resources.

Some examples of the method, apparatuses, and non-transitory computer-readable medium described herein may further include operations, features, means, or instructions for receiving the SI request message via a random access message 3, where the SI request message includes a request for transmission of all on demand SI messages.

Some examples of the method, apparatuses, and non-transitory computer-readable medium described herein may further include operations, features, means, or instructions for receiving the SI request message via a random access message 3, where the SI request message includes a bitmap indicating the set of on demand SI messages.

In some examples of the method, apparatuses, and non-transitory computer-readable medium described herein, the set of on demand SI messages includes all on demand SI messages supported by the base station including the first on demand SI message.

In some examples of the method, apparatuses, and non-transitory computer-readable medium described herein, the first set of resources may be associated with a second set of on demand SI messages including the first on demand SI message.

In some examples of the method, apparatuses, and non-transitory computer-readable medium described herein, the first and second sets of resources exclude random access resources.

In some examples of the method, apparatuses, and non-transitory computer-readable medium described herein, the SI request message may be received via the first set of resources, the second set of resources, or a third set of resources different from the first and second sets of resources.

DETAILED DESCRIPTION

In some wireless communications systems, a user equipment (UE) may use a random access channel (RACH) procedure to establish a connection with a base station and/or identify suitable parameters and configurations for communicating with the base station. In some cases, as part of the RACH procedure, the UE may request one or more system information (SI) messages (e.g., on demand SI messages) from a base station. The base station may configure the UE with RACH resources, which the UE may use to request the on demand SI messages. In an example, the base station may configure the UE with one RACH resource for the UE to use to request all SI messages. In another example, the base station may configure the UE with one RACH resource per SI message such that the UE may request individual SI messages. However, if the UE is configured with one RACH resource per SI message, and the UE requests all SI messages, performing separate RACH procedures, or transmitting separate SI requests to receive all SI messages, may increase latency and overhead.

As described herein, a UE may support efficient techniques for requesting multiple or all SI messages that are on demand when the UE is configured with the option to request SI individually (e.g., with one RACH resource per SI message). In one example, if a UE is configured with one RACH resource per SI message, and the UE decides to request all SI messages that are on demand, the UE may request the SI messages in a message 3 RACH transmission (e.g., a radio resource control (RRC) connection request or a physical uplink shared channel (PUSCH) message). In another example, if a UE is configured with one RACH resource per SI message, the UE may also be configured with at least one additional resource (e.g., RACH resource or other resource) for requesting all SI messages. In this example, if the UE decides to request all SI messages that are on demand, the UE may request the SI messages using the additional resource. Such resource allocations or configurations may be configured by a network device such as a base station and/or may be indicated to the UE through other signaling (master information block (MIB), SI block 1 (SIB1), etc.).

Aspects of the disclosure introduced above are described herein in the context of a wireless communications system. Examples of processes and signaling exchanges that support on demand SI triggering are then described. Aspects of the disclosure are further illustrated by and described with reference to apparatus diagrams, system diagrams, and flowcharts that relate to on demand SI triggering.

Figure 1:
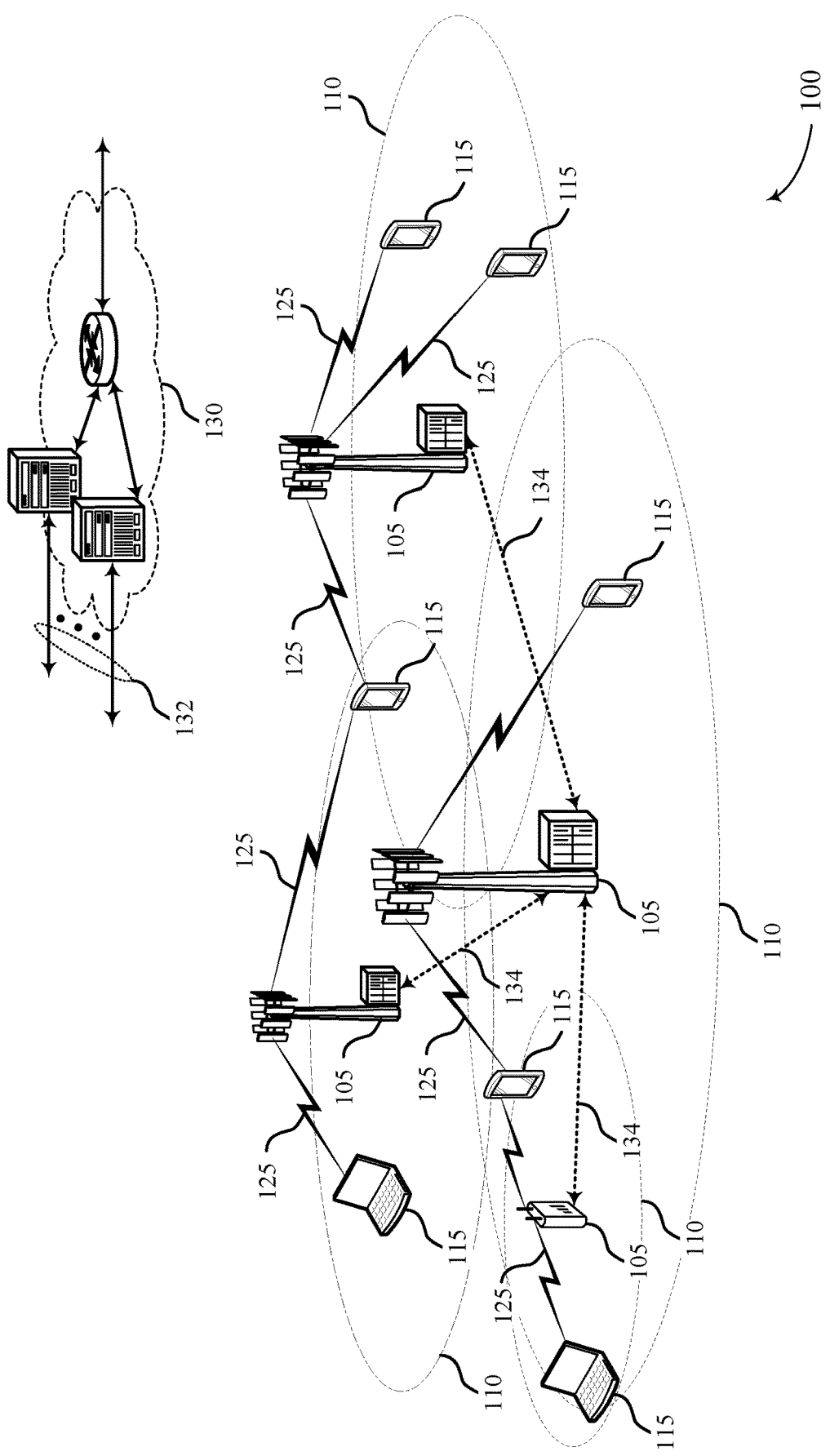
FIG. 1 illustrates an example of a wireless communications system that supports on demand system information (SI) triggering in accordance with aspects of the present disclosure.

FIG. 1 illustrates an example of a wireless communications system 100 that supports on demand SI triggering in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, for example, in the range of 300 megahertz (MHz) to 300 gigahertz (GHz). For instance, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), unlicensed radio frequency spectrum band (e.g., LTE-Unlicensed (LTE-U)) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA).

Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at orientations with respect to an antenna array experience constructive interference while others experience destructive interference. The adjustment of signals communicated via the antenna elements may include a transmitting device or a receiving device applying an amplitude and phase offsets to signals carried via each of the antenna elements associated with the device. The adjustments associated with each of the antenna elements may be defined by a beamforming weight set associated with an orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or SI, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In wireless communications system 100, a UE 115 may use a RACH procedure to establish a connection with a base station 105 and/or identify suitable parameters and configurations for communicating with the base station 105. In some cases, as part of the RACH procedure, it may be appropriate for the UE 115 to request one or more SI messages (e.g., on demand SI messages) from a base station 105. Accordingly, in some cases, if a base station 105 does not configure the UE 115 with one or more RACH parameters and RACH resources for the UE 115 to use to request the on demand SI messages, the UE 115 may request the on demand SI messages in an RRC connection request or message 3 RACH transmission as part of a contention-based random access procedure or message 3-based random access procedure. For instance, the UE 115 may transmit a bitmap in an RRC SI request message to request any combination of on demand SI messages. Alternatively, if a base station 105 configures the UE 115 with RACH parameters and RACH resources for the UE to use to request the on demand SI messages, the UE 115 may request on demand SI in a message 1 RACH transmission on RACH resources as part of a contention-free random access procedure or message 1-based random access procedure.

If a base station 105 is configured with, or configures, a UE 115 with RACH parameters and RACH resources for the UE 115 to use to request the on demand SI messages, the base station 105 may either configure the UE 115 with one RACH resource for the UE 115 to use to request all SI messages, or the base station 105 may configure the UE 115 with one RACH resource per SI message such that the UE 115 may request individual SI messages (e.g., using a corresponding RACH resource). However, if the UE 115 is configured with one RACH resource per SI message, and the UE 115 decides to request all SI messages, the UE 115 may have to perform separate RACH procedures or RACH transmissions on each RACH resource to receive all SI messages, resulting in high latency and overhead in a wireless communications system. Thus, it may be beneficial for a UE 115 in wireless communications system 100 to request a threshold number, or all, on demand SI messages when the UE 115 is configured with one RACH resource per SI message.

Figure 2:
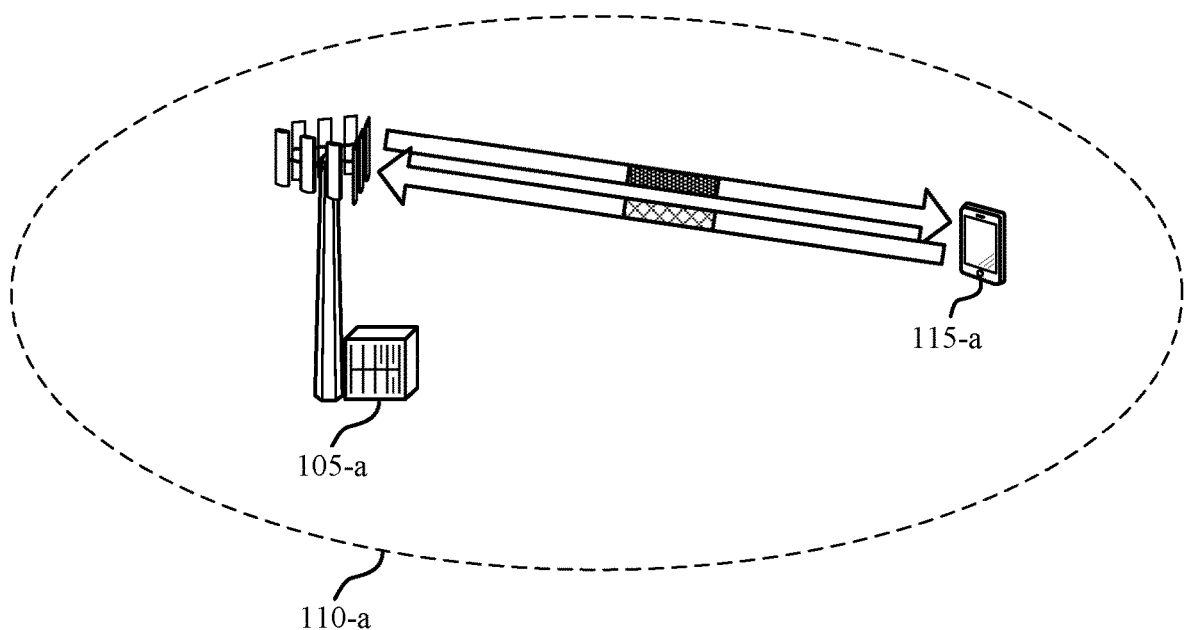
FIG. 2 illustrates an example of a wireless communications system that supports on demand SI triggering in accordance with aspects of the present disclosure.

FIG. 2 illustrates an example of a wireless communications system 200 that supports on demand SI triggering in accordance with aspects of the present disclosure. In some examples, wireless communications system 200 may implement aspects of wireless communications system 100. Wireless communications system 200 includes base station 105-a, which may be an example of a base station 105 described with reference to FIG. 1. Wireless communications system 200 also includes UE 115-a, which may be an example of a UE 115 described with reference to FIG. 1. Base station 105-a may provide communication coverage for a respective coverage area 110-a, which may be an example of a coverage area 110 described with reference to FIG. 1. For example, UE 115-a in wireless communications system 200 may support efficient techniques for requesting all, or a threshold number of, on demand SI messages when the UE 115-a is configured with one RACH resource per SI message (i.e., when the UE 115-a has the option to request SI messages individually).

In some cases, base station 105-a may transmit an SI request resource configuration 205 to UE 115-a indicating RACH parameters and RACH resources (or other resources) for the UE to use to request the on demand SI messages. Base station 105-a may transmit the SI request resource configuration 205 in SIB1. The SI request resource configuration 205 may include SI scheduling information (e.g., information element SI-SchedulingInfo), which may indicate a set of RACH resources for UE 115-a to use to request on demand SI messages from base station 105-a. In some cases, UE 115-a may use each RACH resource to request a corresponding SI message. That is, the SI request resource configuration 205 may configure UE 115-a with one RACH resource per SI message, such that UE 115-a may request each on demand SI message (e.g., of a list of available on demand SI messages) using a corresponding RACH resource. To improve latency and overhead in wireless communications system 200, UE 115-a may use the techniques described herein to request SI messages when UE 115-a decides to request all, or a threshold number of, SI messages.

In an example, if UE 115-a is configured with one RACH resource per SI message, and UE 115-a decides to request all SI messages that are on demand, UE 115-*a* may request the SI messages in an RRC connection request or message 3 RACH transmission. In some cases, if the number of on demand SI RACH resources configured in the SI request resource configuration 205 is greater than a threshold value, and UE 115-*a* decides to request all, or a threshold number of, on demand SI messages, UE 115-*a* may transmit an SI request 210 for the on demand SI messages in the RRC connection request or message 3 RACH transmission (i.e., since the overhead associated with transmitting on each of the RACH resources would be too high if the number of RACH resources is above the threshold). In some examples, the threshold may be equal to the number of on demand SI messages (e.g., the number of on demand SI messages supported by the base station or the number of on demand SI messages requested or to be request by UE 115-*a*). In some cases, the threshold may be less than or greater than the number of on demand SI messages.

According to some aspects, when the number of resources (e.g., number of RACH resources, number of available resources for SI messages, or number of other resources configured for SI messages) is greater than the number of on demand SI messages (e.g., the number of on demand SI messages supported by the base station 105-*a*), UE 115-*a* may utilize any of the available resources. For instance, UE 115-*a* may utilize any set of available resources from a set of resource configurations or from a list of resources (e.g., the first resource configuration, the last resource configuration, or any available resources of a set of resources indicated by a list of resources). In some cases, UE 115-*a* may utilize the first set of resources after N where N=the number of SI messages.

In another example, if UE 115-*a* is configured with one RACH resource per SI message, UE 115-*a* may also be configured with at least one additional RACH resource for requesting all, or a threshold number of, on demand SI messages. In this example, the RACH resource configuration may indicate an additional RACH resource for requesting all, or a threshold number of, on demand SI messages, where the additional RACH resource may be a first or last RACH resource configured by base station 105-*a* in the SI request resource configuration 205. Thus, if the UE 115-*a* decides to request all SI messages that are on demand, the UE 115-*a* may request the SI messages using the additional RACH resource. That is, if the number of RACH resources or entries in the list of RACH resources in the SI request resource configuration 205 is greater than the number of on demand SI messages, the first or last RACH resource or entry may be used to request all, or a threshold number of, on demand SI messages (e.g., for which the broadcast status is set to "notBroadcasting"). In some examples, the at least one additional RACH resource may be for requesting one or more on demand SI messages. For example, the at least one additional RACH resource may include a first additional RACH resource for requesting a first on demand SI message, a second additional RACH resource for requesting a second on demand SI message, and/or a third additional RACH resource for requesting all on demand SI messages.

In some aspects, base station 105-*a* may also configure RACH resources each corresponding to a set of, or a number of, SI messages (K1, K2, etc. SI messages). In some examples, K1 and K2 may overlap (e.g., one or messages associated with K1 may be the same as one or more messages associated with K2). In some aspects, UE 115-*a* may use each of these RACH resources to request a corresponding set of SI messages. That is, base station 105-*a* may configure RACH resources that each correspond to one on demand SI message (i.e., where each of these RACH resources is used to request a corresponding on demand SI message), a RACH resource that corresponds to all on demand SI messages (i.e., where this RACH resource is used to request all on demand SI messages), and RACH resources that each correspond to a set of on demand SI messages (i.e., where each of these RACH resources is used to request a corresponding set of on demand SI messages). In such aspects, the additional RACH resources (i.e., corresponding to all on demand SI messages and different sets of on demand SI messages) may be a first or last set of RACH resources configured by base station 105-*a* in the SI request resource configuration 205.

In another example, if UE 115-*a* is configured with one RACH resource per SI message, the UE may also be configured with at least one additional resource (e.g., different from a RACH resource) for requesting all, or a threshold number of, on demand SI messages. In this example, the RACH resource configuration may indicate the additional resource for requesting all, or a threshold number of, on demand SI messages. Thus, if the UE decides to request all, or a threshold number of, SI messages that are on demand, the UE may request the SI messages using the additional resource.

Figure 3:
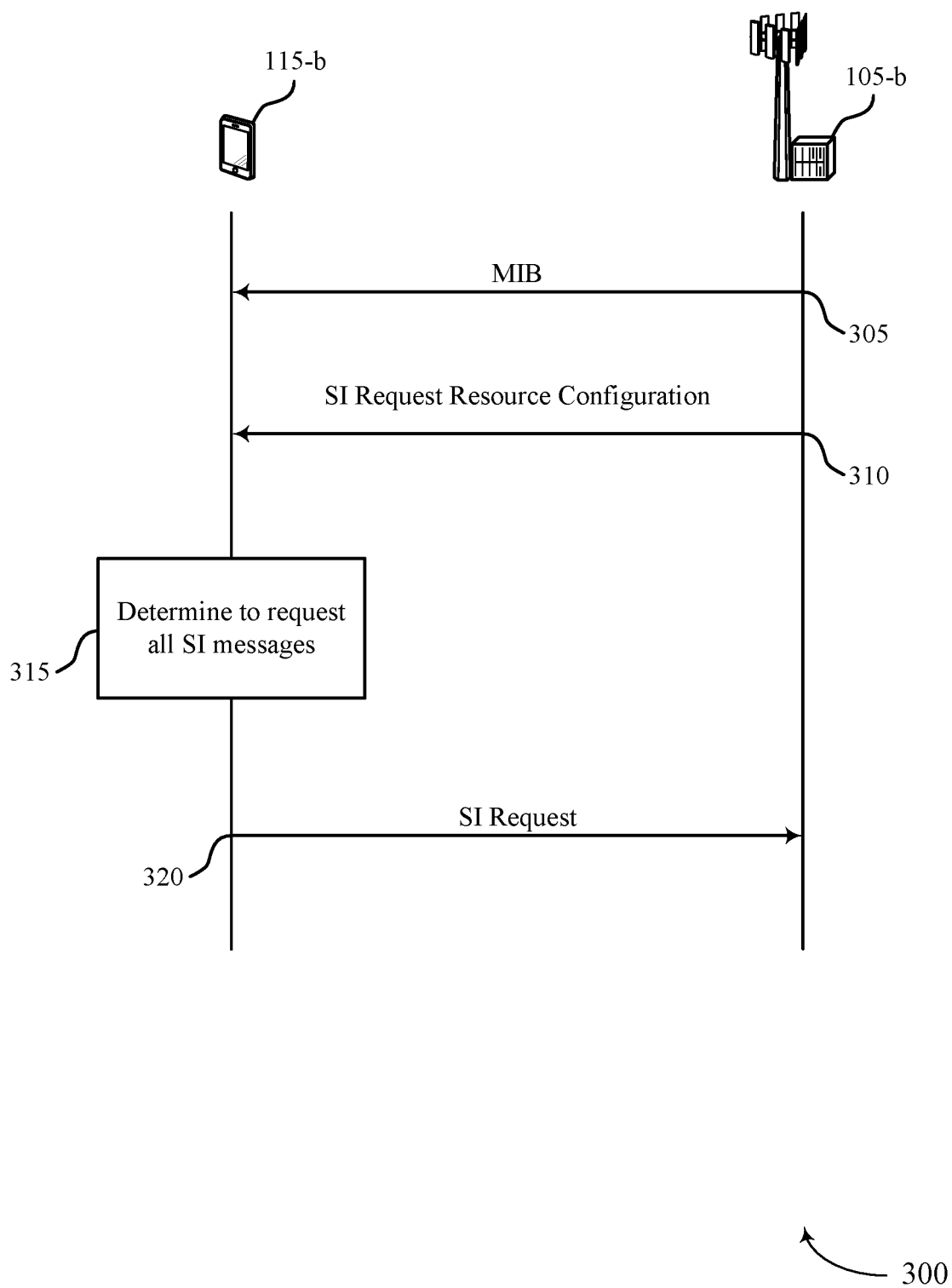
FIG. 3 illustrates an example of a process flow that supports on demand SI triggering in accordance with aspects of the present disclosure.

FIG. 3 illustrates an example of a process flow 300 that supports on demand SI triggering in accordance with aspects of the present disclosure. In some examples, process flow 300 may implement aspects of wireless communication system 100. Process flow 300 illustrates aspects of techniques performed by a base station 105-*b*, which may be an example of a base station 105 described with reference to FIGS. 1 and 2. Process flow 300 also illustrates aspects of techniques performed by UE 115-*b*, which may be an example of a UE 115 described with reference to FIGS. 1 and 2. Process flow 300 may implement aspects of wireless communications system 100. For example, UE 115-*b* in process flow 300 may support efficient techniques for requesting all (or a threshold number of) on demand SI messages when the UE 115-*a* is configured with one RACH resource per SI message (i.e., when UE 115-*a* has the option to request SI messages individually).

At 305, base station 105-*b* may transmit a MIB to UE 115-*b* as part of a synchronization, connection, or acquisition procedure. The MIB may indicate the location or the resources on which to receive a SIB1. At 310, UE 115-*b* may receive a SIB1 from base station 105-*b* including an SI request resource configuration (e.g., SI scheduling information). The SI request resource configuration may indicate RACH resources for UE 115-*b* to use to request on demand SI messages from base station 105-*b*. For example, the SI request resource configuration may indicate one RACH resource per SI message such that UE 115-*b* may use a RACH resource to request an SI message. That is, the SI request resource configuration may indicate a first RACH resource associated with a first on demand SI message, a second RACH resource associated with a second on demand SI message, etc.

At 315, UE 115-*b* may determine to request all, or a threshold number of, on demand SI messages from base station 105-*b*. Thus, UE 115-*b* may use the techniques described herein to request all, or a threshold number of, on demand SI messages from base station 105-*b* to limit the overhead and latency associated with requesting all, or a threshold number of, the on demand SI messages individually. For example, at 320, UE 115-*b* may transmit a single SI request to base station 105-*b* to request a transmission of a plurality of on demand SI messages (e.g., as opposed to transmitting SI requests on each of the RACH resources to receive the on demand SI messages associated with each of the RACH resources).

In one example, at 320, UE 115-b may transmit the SI request in an RRC connection request or message 3 RACH transmission to request all the on demand SI messages from base station 105-b (e.g., in a bitmap in an RRC SI request message). In some cases, UE 115-b may transmit the SI request in the RRC connection request or message 3 RACH transmission if the number of RACH resources configured in the SI request resource configuration exceeds a threshold (i.e., since the overhead associated with transmitting on each of the RACH resources would be too high if the number of RACH resources is above the threshold).

In another example, base station 105-b may configure an additional RACH resource for UE 115-b to use to request all, or a threshold number of, the on demand SI messages from base station 105-b, and, at 320, base station 105-b may transmit the SI request on the additional RACH resource to request all, or a threshold number of, the on demand SI messages from base station 105-b. In yet another example, base station 105-b may configure an additional resource (i.e., different from a RACH resource) for UE 115-b to use to request all of the on demand SI messages from base station 105-b, and, at 320, base station 105-b may transmit the SI request on the additional resource to request all the on demand SI messages from base station 105-b.

Figure 4:
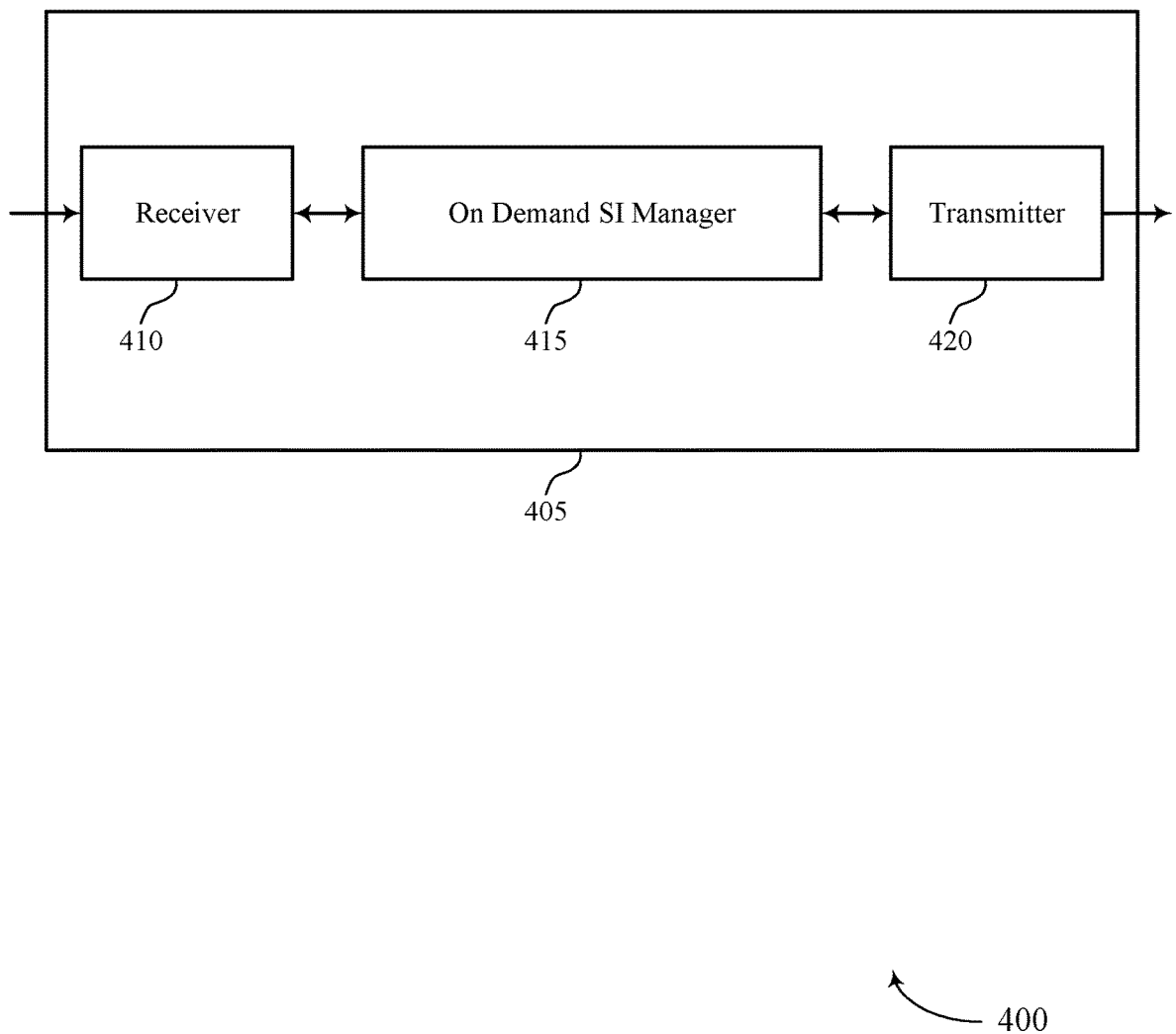
FIGS. 4 and 5 show block diagrams of devices that support on demand SI triggering in accordance with aspects of the present disclosure.

FIG. 4 shows a block diagram 400 of a device 405 that supports on demand SI triggering in accordance with aspects of the present disclosure. The device 405 may be an example of aspects of a UE 115 as described herein. The device 405 may include a receiver 410, an on demand SI manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to on demand SI triggering, etc.). Information may be passed on to other components of the device 405. The receiver 410 may be an example of aspects of the transceiver 720 described with reference to FIG. 7. The receiver 410 may utilize a single antenna or a set of antennas.

The on demand SI manager 415 may receive, from a base station, an indication of on demand SI resources including a first set of resources associated with a first on demand SI message supported by the base station and a second set of resources associated with a second on demand SI message supported by the base station and transmit an SI request message to the base station in response to the receiving, the SI request message including a request for transmission of a set of on demand SI messages. The on demand SI manager 415 may be an example of aspects of the on demand SI manager 710 described herein.

The on demand SI manager 415, or its sub-components, may be implemented in hardware, code (e.g., software or firmware) executed by a processor, or any combination thereof. If implemented in code executed by a processor, the functions of the on demand SI manager 415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The on demand SI manager 415, or its sub-components, may be physically located at various positions, including being distributed such that portions of functions are implemented at different physical locations by one or more physical components. In some examples, the on demand SI manager 415, or its sub-components, may be a separate and distinct component in accordance with various aspects of the present disclosure. In some examples, the on demand SI manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver component. For example, the transmitter 420 may be an example of aspects of the transceiver 720 described with reference to FIG. 7. The transmitter 420 may utilize a single antenna or a set of antennas.

Figure 5:
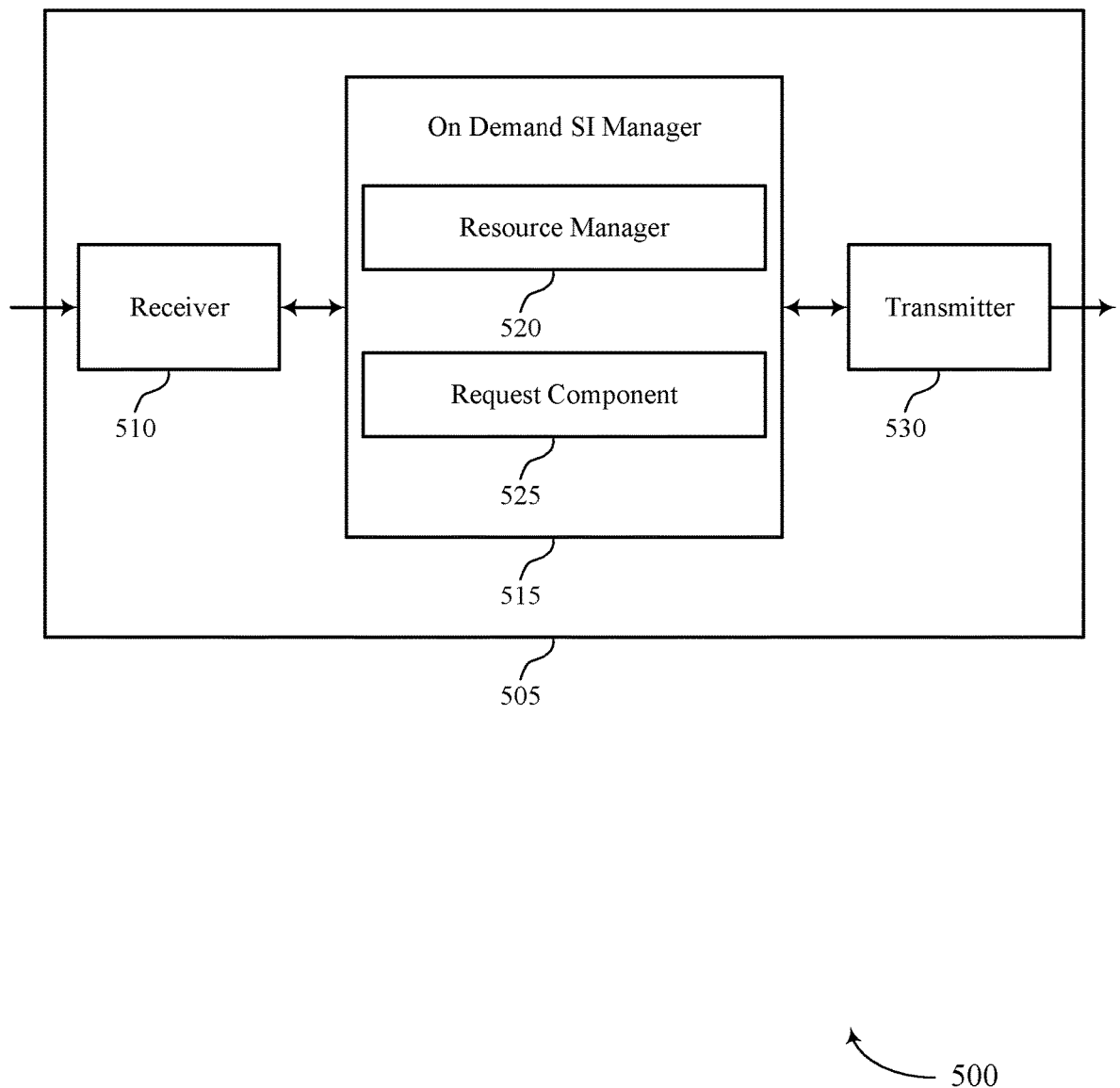

FIG. 5 shows a block diagram 500 of a device 505 that supports on demand SI triggering in accordance with aspects of the present disclosure. The device 505 may be an example of aspects of a device 405, or a UE 115 as described herein. The device 505 may include a receiver 510, an on demand SI manager 515, and a transmitter 530. The device 505 may also include a processor. Each of these components may be in communication with one another (e.g., via one or more buses).

The receiver 510 may receive information such as packets, user data, or control information associated with various information channels (e.g., control channels, data channels, and information related to on demand SI triggering, etc.). Information may be passed on to other components of the device 505. The receiver 510 may be an example of aspects of the transceiver 720 described with reference to FIG. 7. The receiver 510 may utilize a single antenna or a set of antennas.

The on demand SI manager 515 may be an example of aspects of the on demand SI manager 415 as described herein. The on demand SI manager 515 may include a resource manager 520 and a request component 525. The on demand SI manager 515 may be an example of aspects of the on demand SI manager 710 described herein.

In some examples, the on demand SI manager 515 may be implemented as an integrated circuit or chipset for a mobile device modem, and the receiver 510 and transmitter 520 may be implemented as analog components (e.g., amplifiers, filters, antennas) coupled with the mobile device modem to enable wireless transmission and reception over one or more bands.

The actions performed by the on demand SI manager 515 as described herein may be implemented to realize one or more potential advantages. One implementation may enable a wireless device, such as a UE, to request all, or multiple, SI messages that are on demand with a RACH transmission message or an additional RACH resource. Such resource allocation may enable for overhead reduction, which may result in higher data rates and more efficient communications (e.g., less overhead), among other advantages.

Based on implementing the techniques for requesting multiple or all SI messages as described herein, a processor of a wireless node (e.g., a processor controlling the receiver 510, the on demand SI manager 515, the transmitter 520, or a combination thereof) may improve power consumption by reducing signaling overhead in a communications system while ensuring relatively efficient communications. For example, the SI message request techniques described herein may leverage a resource allocation configuration that utilizes an additional RACH resource or a RACH message to realize reduced signaling overhead and power savings, among other benefits.

The resource manager 520 may receive, from a base station, an indication of on demand SI resources including a first set of resources associated with a first on demand SI message supported by the base station and a second set of resources associated with a second on demand SI message supported by the base station.

The request component 525 may transmit an SI request message to the base station in response to the receiving, the SI request message including a request for transmission of a set of on demand SI messages.

The transmitter 530 may transmit signals generated by other components of the device 505. In some examples, the transmitter 530 may be collocated with a receiver 510 in a transceiver component. For example, the transmitter 530 may be an example of aspects of the transceiver 720 described with reference to FIG. 7. The transmitter 530 may utilize a single antenna or a set of antennas.

Figure 6:
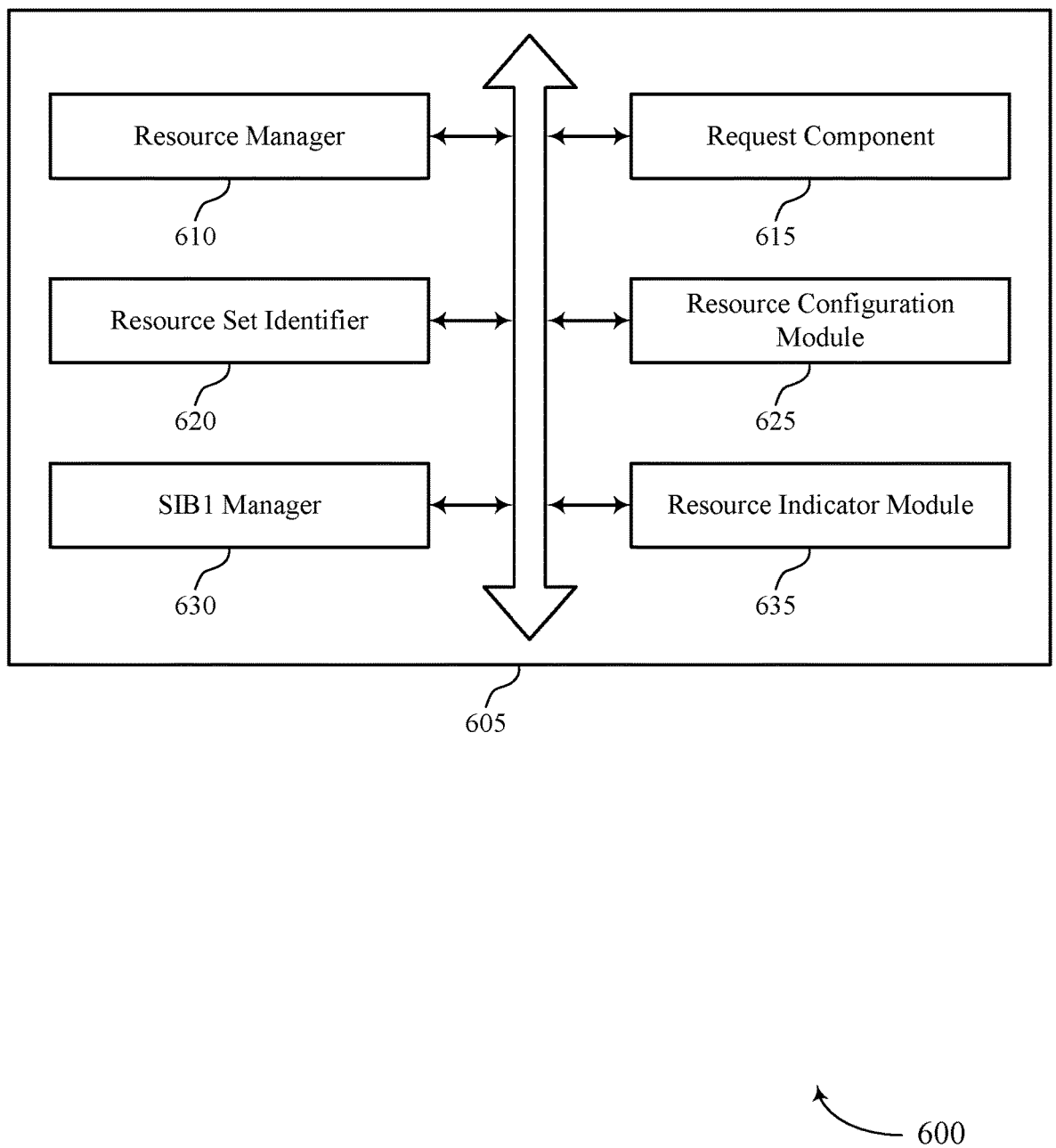
FIG. 6 shows a block diagram of a on demand SI manager that supports on demand SI triggering in accordance with aspects of the present disclosure.

FIG. 6 shows a block diagram 600 of a on demand SI manager 605 that supports on demand SI triggering in accordance with aspects of the present disclosure. The on demand SI manager 605 may be an example of aspects of a on demand SI manager 415, a on demand SI manager 515, or a on demand SI manager 710 described herein. The on demand SI manager 605 may include a resource manager 610, a request component 615, a resource set identifier 620, a resource configuration component 625, a SIB1 manager 630, and a resource indicator component 635. Each of these components may communicate, directly or indirectly, with one another (e.g., via one or more buses).

The resource manager 610 may receive, from a base station, an indication of on demand SI resources including a first set of resources associated with a first on demand SI message supported by the base station and a second set of resources associated with a second on demand SI message supported by the base station.

In some cases, the indication of on demand SI resources includes a list of resource configurations for on demand SI messages. In some cases, the set of on demand SI messages includes all on demand SI messages supported by the base station including the first and second on demand SI messages. In some cases, the first and second sets of resources either include or exclude random access resources.

The request component 615 may transmit an SI request message to the base station in response to the receiving the SI request message, including a request for transmission of a set of on demand SI messages. In some examples, the request component 615 may transmit the SI request message via a random access message 3 based on the number of sets of resources exceeding a threshold, where the SI request message includes a request for transmission of all on demand SI messages or a bitmap indicating the set of on demand SI messages. In some examples, the request component 615 may transmit the SI request message via a random access message 1.

In some examples, the request component 615 may transmit the SI request message, including a request for all on demand SI messages according to an initial or a last resource configuration in the list. In some cases, the SI request message is transmitted via the first set of resources, the second set of resources, or a third set of resources different from the first and second sets of resources.

The resource set identifier 620 may identify a number of sets of resources associated with on demand SI based on the indication of on demand SI resources. The resource configuration component 625 may determine that a number of resource configurations in the list exceeds a threshold.

The SIB1 manager 630 may receive a SIB1 message including the indication of on demand SI resources. In some examples, the SIB1 manager 630 may receive SI scheduling information via the SIB1 message, where the indication of on demand SI resources is conveyed via the SI scheduling information.

The resource indicator component 635 may identify a set of resource indicators associated with the on demand SI resources based on the SIB1 message. In some cases, each of the set of resource indicators corresponds to a respective on demand SI message supported by the base station. In some cases, an initial resource indicator or a last resource indicator of the set of resource indicators corresponds to all on demand SI messages supported by the base station. In some cases, an initial resource indicator or a last resource indicator of the set of resource indicators corresponds to the second set of resources. In some cases, a first resource indicator of the set of resource indicators corresponds to a first subset of on demand SI messages supported by the base station. In some cases, a second resource indicator of the set of resource indicators corresponds to a second subset of on demand SI messages supported by the base station.

Figure 7:
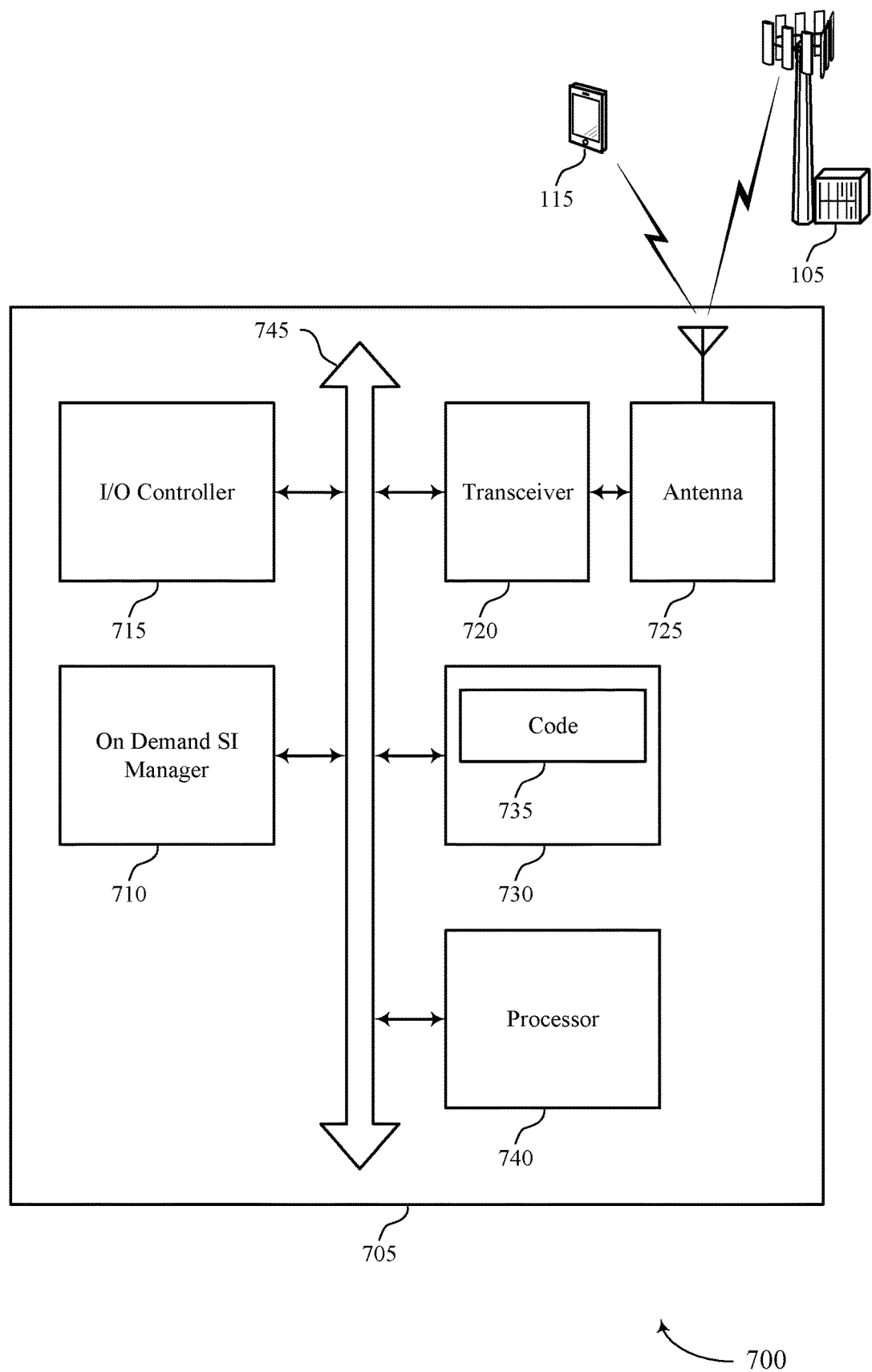
FIG. 7 shows a diagram of a system including a device that supports on demand SI triggering in accordance with aspects of the present disclosure.

FIG. 7 shows a diagram of a system 700 including a device 705 that supports on demand SI triggering in accordance with aspects of the present disclosure. The device 705 may be an example of or include the components of device 405, device 505, or a UE 115 as described herein. The device 705 may include components for bi-directional voice and data communications including components for transmitting and receiving communications, including an on demand SI manager 710, an I/O controller 715, a transceiver 720, an antenna 725, memory 730, and a processor 740. These components may be in electronic communication via one or more buses (e.g., bus 745).

The on demand SI manager 710 may receive, from a base station, an indication of on demand SI resources including a first set of resources associated with a first on demand SI message supported by the base station and a second set of resources associated with a second on demand SI message supported by the base station and transmit an SI request message to the base station in response to the receiving, the SI request message including a request for transmission of a set of on demand SI messages.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random access memory (RAM) and read only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting on demand SI triggering).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
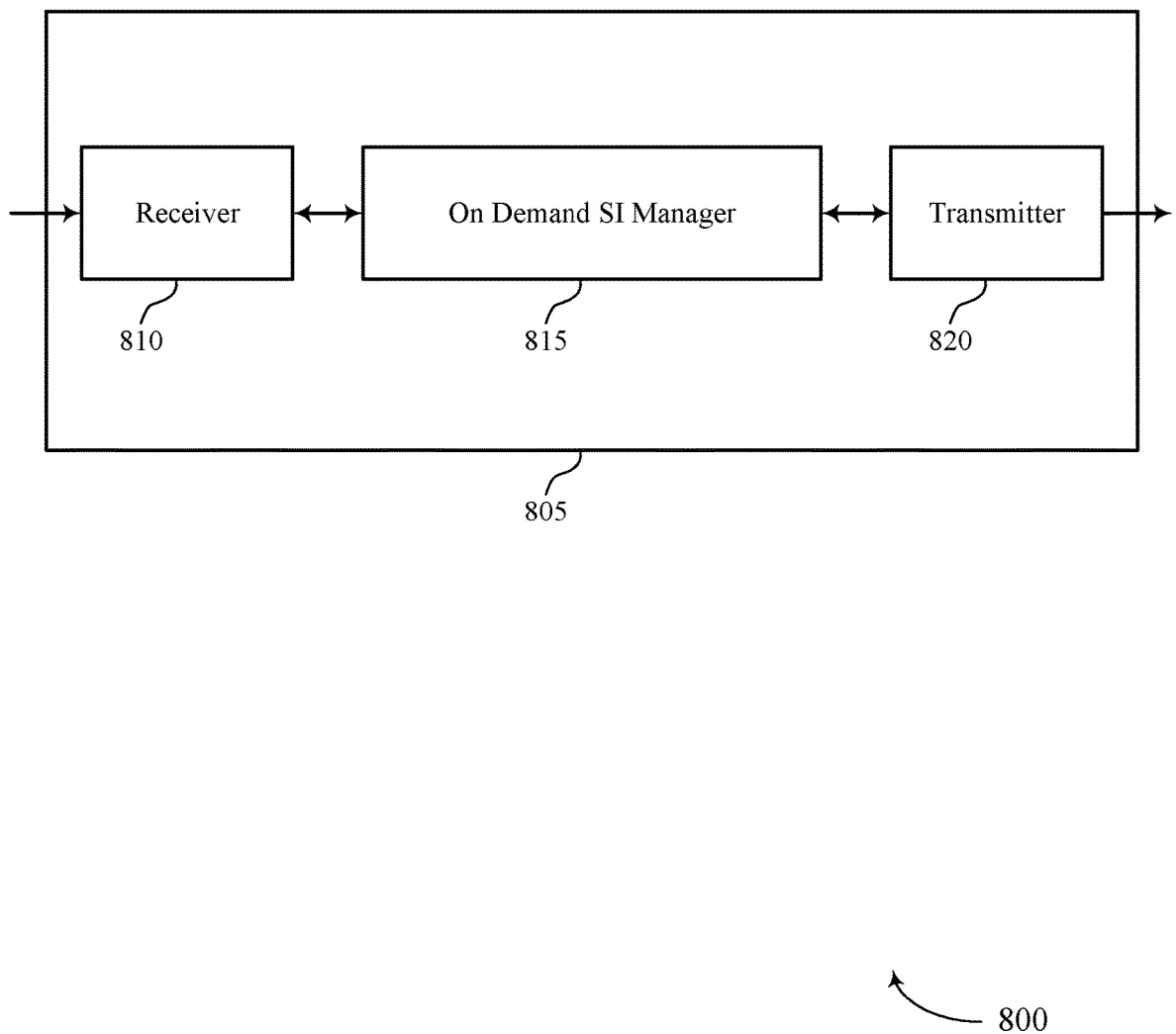
FIGS. 8 and 9 show block diagrams of devices that support on demand SI triggering in accordance with aspects of the present disclosure.

FIG. 8 shows a block diagram 800 of a device 805 that supports on demand SI triggering in accordance with aspects of the present disclosure. The device 805 may be an example of aspects of a base station 105 as described herein. The device 805 may include a receiver 810, an on demand SI manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to on demand SI triggering, etc.). Information may be passed on to other components of the device 805. The receiver 810 may be an example of aspects of the transceiver 1120 described with reference to FIG. 11. The receiver 810 may utilize a single antenna or a set of antennas.

The on demand SI manager 815 may configure a set of resources for on demand SI, the set of resources including a first set of resources associated with a first on demand SI message supported by the base station and a second set of resources associated a set of on demand SI messages supported by the base station, transmit an indication of the set of resources configured for on demand SI, and receive an SI request message from a UE in response to the transmitting, the SI request message including a request for transmission of one or more on demand SI messages. The on demand SI manager 815 may be an example of aspects of the on demand SI manager 1110 described herein.

The on demand SI manager 815, or its sub-components, may be implemented in hardware, code (e.g., software or firmware) executed by a processor, or any combination thereof. If implemented in code executed by a processor, the functions of the on demand SI manager 815, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The on demand SI manager 815, or its sub-components, may be physically located at various positions, including being distributed such that portions of functions are implemented at different physical locations by one or more physical components. In some examples, the on demand SI manager 815, or its sub-components, may be a separate and distinct component in accordance with various aspects of the present disclosure. In some examples, the on demand SI manager 815, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver component. For example, the transmitter 820 may be an example of aspects of the transceiver 1120 described with reference to FIG. 11. The transmitter 820 may utilize a single antenna or a set of antennas.

Figure 9:
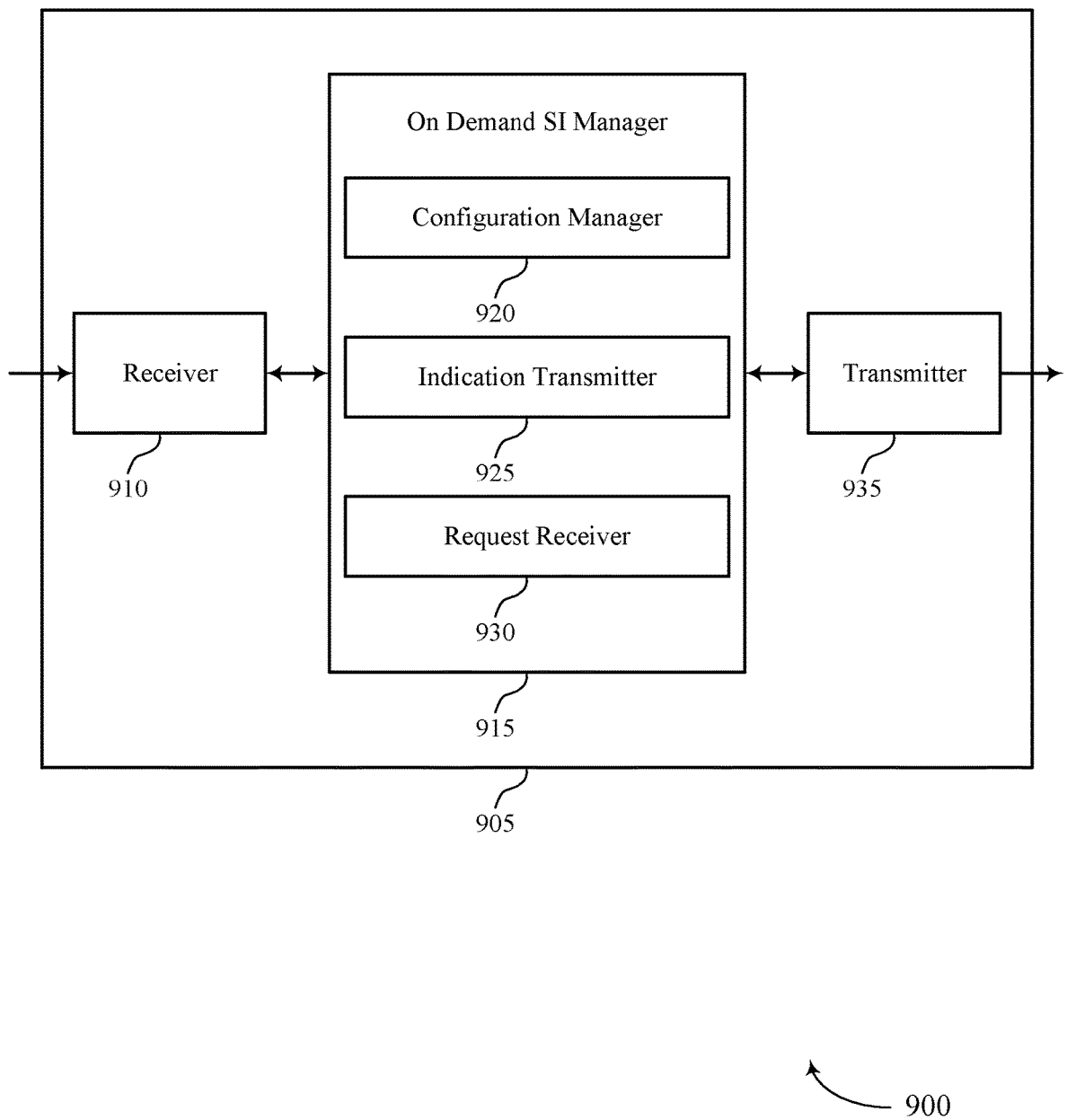

FIG. 9 shows a block diagram 900 of a device 905 that supports on demand SI triggering in accordance with aspects of the present disclosure. The device 905 may be an example of aspects of a device 805, or a base station 105 as described herein. The device 905 may include a receiver 910, an on demand SI manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to on demand SI triggering, etc.). Information may be passed on to other components of the device 905. The receiver 910 may be an example of aspects of the transceiver 1120 described with reference to FIG. 11. The receiver 910 may utilize a single antenna or a set of antennas.

The on demand SI manager 915 may be an example of aspects of the on demand SI manager 815 as described herein. The on demand SI manager 915 may include a configuration manager 920, an indication transmitter 925, and a request receiver 930. The on demand SI manager 915 may be an example of aspects of the on demand SI manager 1110 described herein.

The configuration manager 920 may configure a set of resources for on demand SI, the set of resources including a first set of resources associated with a first on demand SI message supported by the base station and a second set of resources associated a set of on demand SI messages supported by the base station. The indication transmitter 925 may transmit an indication of the set of resources configured for on demand SI. The request receiver 930 may receive an SI request message from a UE in response to the transmitting, the SI request message including a request for transmission of one or more on demand SI messages.

The transmitter 935 may transmit signals generated by other components of the device 905. In some examples, the transmitter 935 may be collocated with a receiver 910 in a transceiver component. For example, the transmitter 935 may be an example of aspects of the transceiver 1120 described with reference to FIG. 11. The transmitter 935 may utilize a single antenna or a set of antennas.

Figure 10:
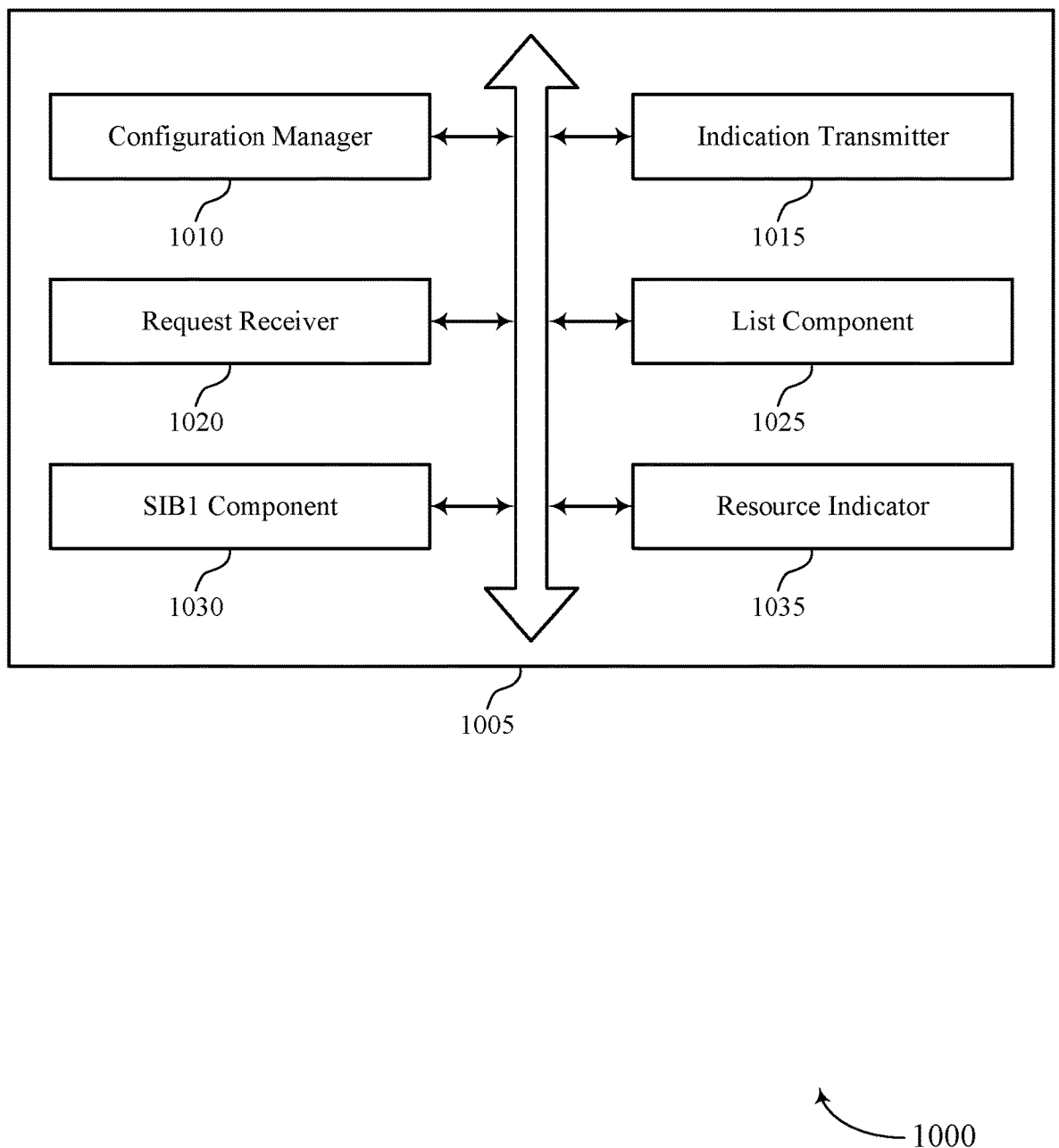
FIG. 10 shows a block diagram of a on demand SI manager that supports on demand SI triggering in accordance with aspects of the present disclosure.

FIG. 10 shows a block diagram 1000 of a on demand SI manager 1005 that supports on demand SI triggering in accordance with aspects of the present disclosure. The on demand SI manager 1005 may be an example of aspects of a on demand SI manager 815, a on demand SI manager 915, or a on demand SI manager 1110 described herein. The on demand SI manager 1005 may include a configuration manager 1010, an indication transmitter 1015, a request receiver 1020, a list component 1025, a SIB1 component 1030, and a resource indicator 1035. Each of these components may communicate, directly or indirectly, with one another (e.g., via one or more buses).

The configuration manager 1010 may configure a set of resources for on demand SI, the set of resources including a first set of resources associated with a first on demand SI message supported by the base station and a second set of resources associated a set of on demand SI messages supported by the base station. In some examples, the configuration manager 1010 may configure a set of random access resources as the first set of resources and the second set of resources. In some cases, the set of on demand SI messages includes all on demand SI messages supported by the base station including the first on demand SI message. In some cases, the first set of resources is associated with a second set of on demand SI messages including the first on demand SI message. In some cases, the first and second sets of resources exclude random access resources.

The indication transmitter 1015 may transmit an indication of the set of resources configured for on demand SI.

The request receiver 1020 may receive an SI request message from a UE in response to the transmitting, the SI request message including a request for transmission of one or more on demand SI messages. In some examples, the request receiver 1020 may receive the SI request message via a random access message 3, where the SI request message includes a request for transmission of all on demand SI messages. In some examples, the request receiver 1020 may receive the SI request message via a random access message 3, where the SI request message includes a bitmap indicating the set of on demand SI messages. In some cases, the SI request message is received via the first set of resources, the second set of resources, or a third set of resources different from the first and second sets of resources.

The list component 1025 may transmit a list of resource configurations for on demand SI messages, where an initial resource configuration in the list or a last resource configuration in the list is associated with resources for all on demand SI message supported by the base station. In some examples, the list component 1025 may include the list of resource configurations in the indication of the set of resources.

The SIB1 component 1030 may transmit the indication of the set of resources via a SIB1 message. In some examples, the SIB1 component 1030 may transmit SI scheduling information via the SIB1 message, where the indication of on demand SI resources is conveyed via the SI scheduling information.

The resource indicator 1035 may include a set of resource indicators associated with the on demand SI resources in the SIB1 message. In some cases, each of the set of resource indicators corresponds to a respective on demand SI message supported by the base station. In some cases, an initial resource indicator or a last resource indicator of the set of resource indicators corresponds to all on demand SI messages supported by the base station. In some cases, an initial resource indicator or a last resource indicator of the set of resource indicators corresponds to the second set of resources. In some cases, a first resource indicator of the set of resource indicators corresponds to a first subset of on demand SI messages supported by the base station. In some cases, a second resource indicator of the set of resource indicators corresponds to a second subset of on demand SI messages supported by the base station.

Figure 11:
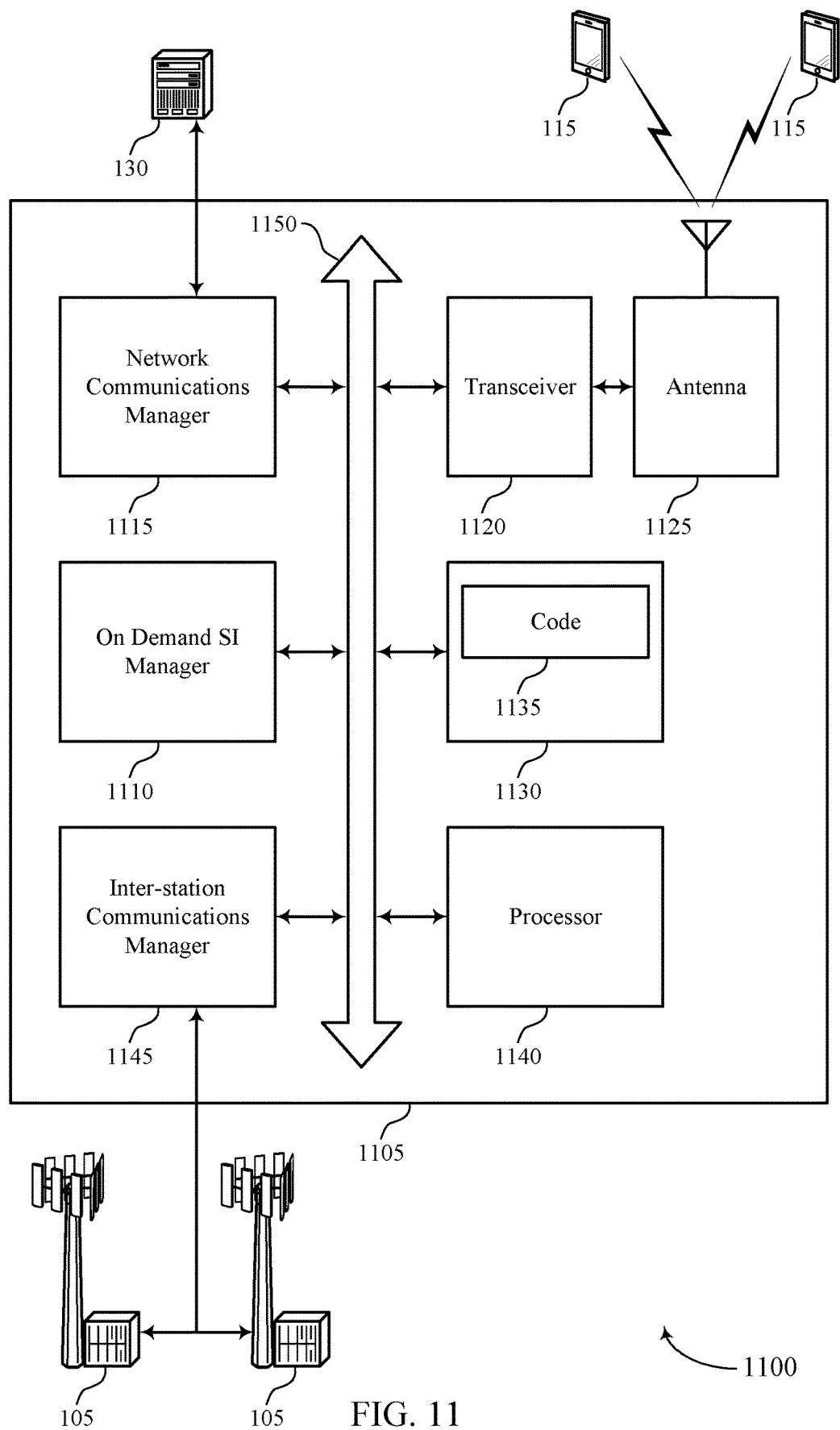
FIG. 11 shows a diagram of a system including a device that supports on demand SI triggering in accordance with aspects of the present disclosure.

FIG. 11 shows a diagram of a system 1100 including a device 1105 that supports on demand SI triggering in accordance with aspects of the present disclosure. The device 1105 may be an example of or include the components of device 805, device 905, or a base station 105 as described herein. The device 1105 may include components for bi-directional voice and data communications including components for transmitting and receiving communications, including an on demand SI manager 1110, a network communications manager 1115, a transceiver 1120, an antenna 1125, memory 1130, a processor 1140, and an inter-station communications manager 1145. These components may be in electronic communication via one or more buses (e.g., bus 1150).

The on demand SI manager 1110 may configure a set of resources for on demand SI, the set of resources including a first set of resources associated with a first on demand SI message supported by the base station and a second set of resources associated a set of on demand SI messages supported by the base station, transmit an indication of the set of resources configured for on demand SI, and receive an SI request message from a UE in response to the transmitting, the SI request message including a request for transmission of one or more on demand SI messages.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting on demand SI triggering).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
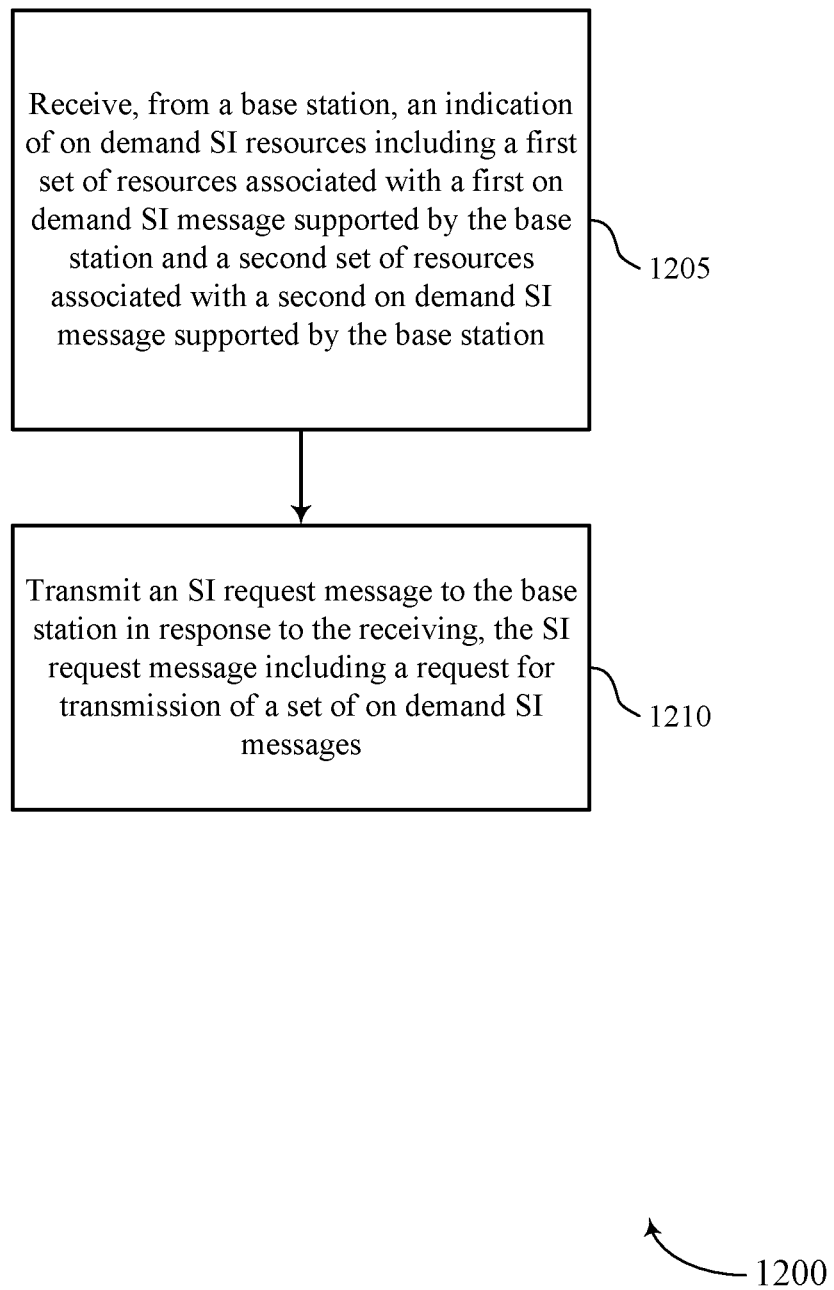
FIGS. 12 through 17 show flowcharts illustrating methods that support on demand SI triggering in accordance with aspects of the present disclosure.

FIG. 12 shows a flowchart illustrating a method 1200 that supports on demand SI triggering in accordance with aspects of the present disclosure. The operations of method 1200 may be implemented by a UE 115 or its components as described herein. For example, the operations of method 1200 may be performed by a on demand SI manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1205, the UE may receive, from a base station, an indication of on demand SI resources including a first set of resources associated with a first on demand SI message supported by the base station and a second set of resources associated with a second on demand SI message supported by the base station. The operations of 1205 may be performed according to the methods described herein. In some examples, aspects of the operations of 1205 may be performed by a resource manager as described with reference to FIGS. 4 through 7.

At 1210, the UE may transmit an SI request message to the base station in response to the receiving, the SI request message including a request for transmission of a set of on demand SI messages. The operations of 1210 may be performed according to the methods described herein. In some examples, aspects of the operations of 1210 may be performed by a request component as described with reference to FIGS. 4 through 7.

Figure 13:
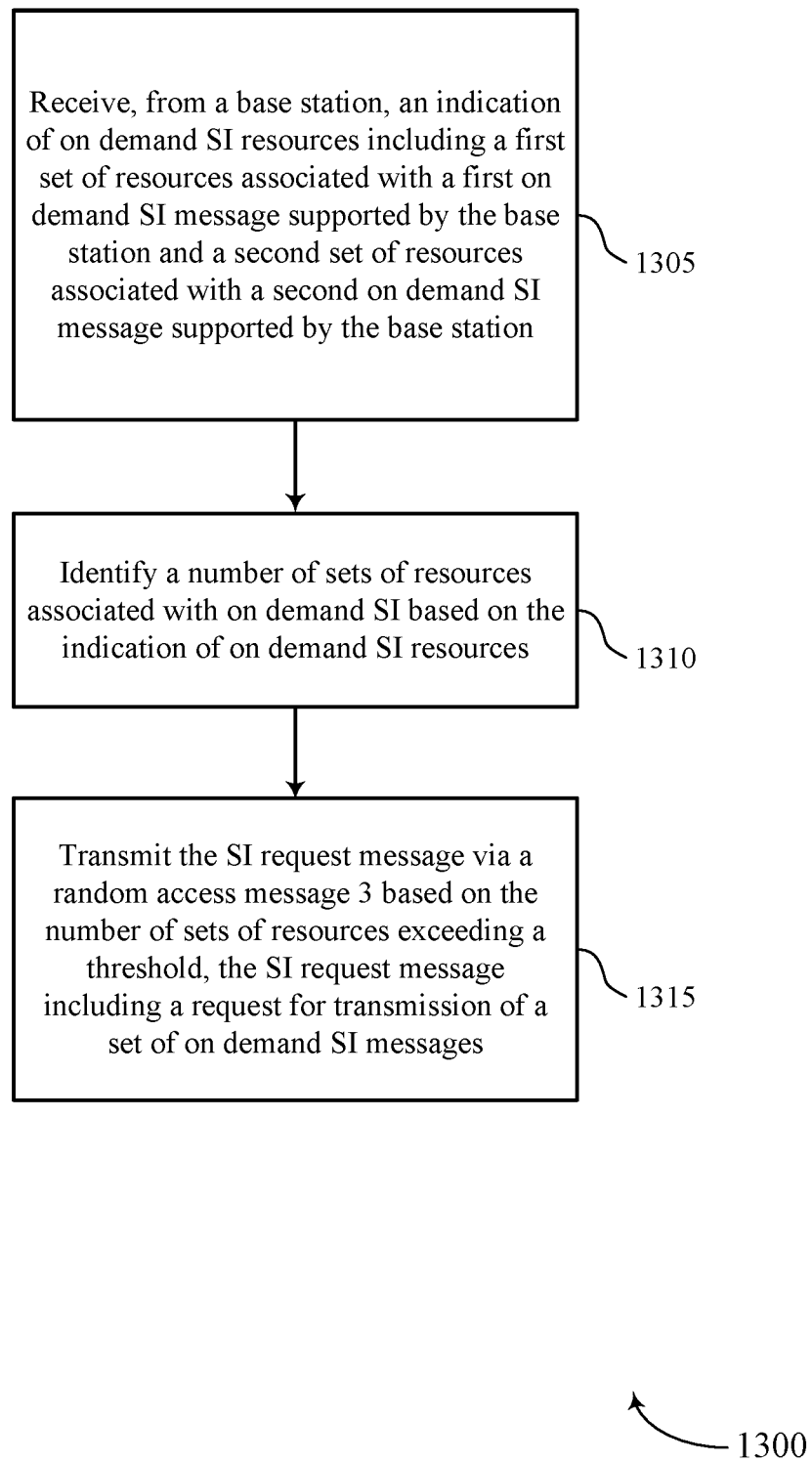

FIG. 13 shows a flowchart illustrating a method 1300 that supports on demand SI triggering in accordance with aspects of the present disclosure. The operations of method 1300 may be implemented by a UE 115 or its components as described herein. For example, the operations of method 1300 may be performed by a on demand SI manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1305, the UE may receive, from a base station, an indication of on demand SI resources including a first set of resources associated with a first on demand SI message supported by the base station and a second set of resources associated with a second on demand SI message supported by the base station. The operations of 1305 may be performed according to the methods described herein. In some examples, aspects of the operations of 1305 may be performed by a resource manager as described with reference to FIGS. 4 through 7.

At 1310, the UE may identify a number of sets of resources associated with on demand SI based on the indication of on demand SI resources. The operations of 1310 may be performed according to the methods described herein. In some examples, aspects of the operations of 1310 may be performed by a resource set identifier as described with reference to FIGS. 4 through 7.

At 1315, the UE may transmit the SI request message via a random access message 3 based on the number of sets of resources exceeding a threshold, the SI request message including a request for transmission of a set of on demand SI messages. In some cases, at 1315, the UE may transmit the SI request message via a random access message 1. The operations of 1315 may be performed according to the methods described herein. In some examples, aspects of the operations of 1315 may be performed by a request component as described with reference to FIGS. 4 through 7.

Figure 14:
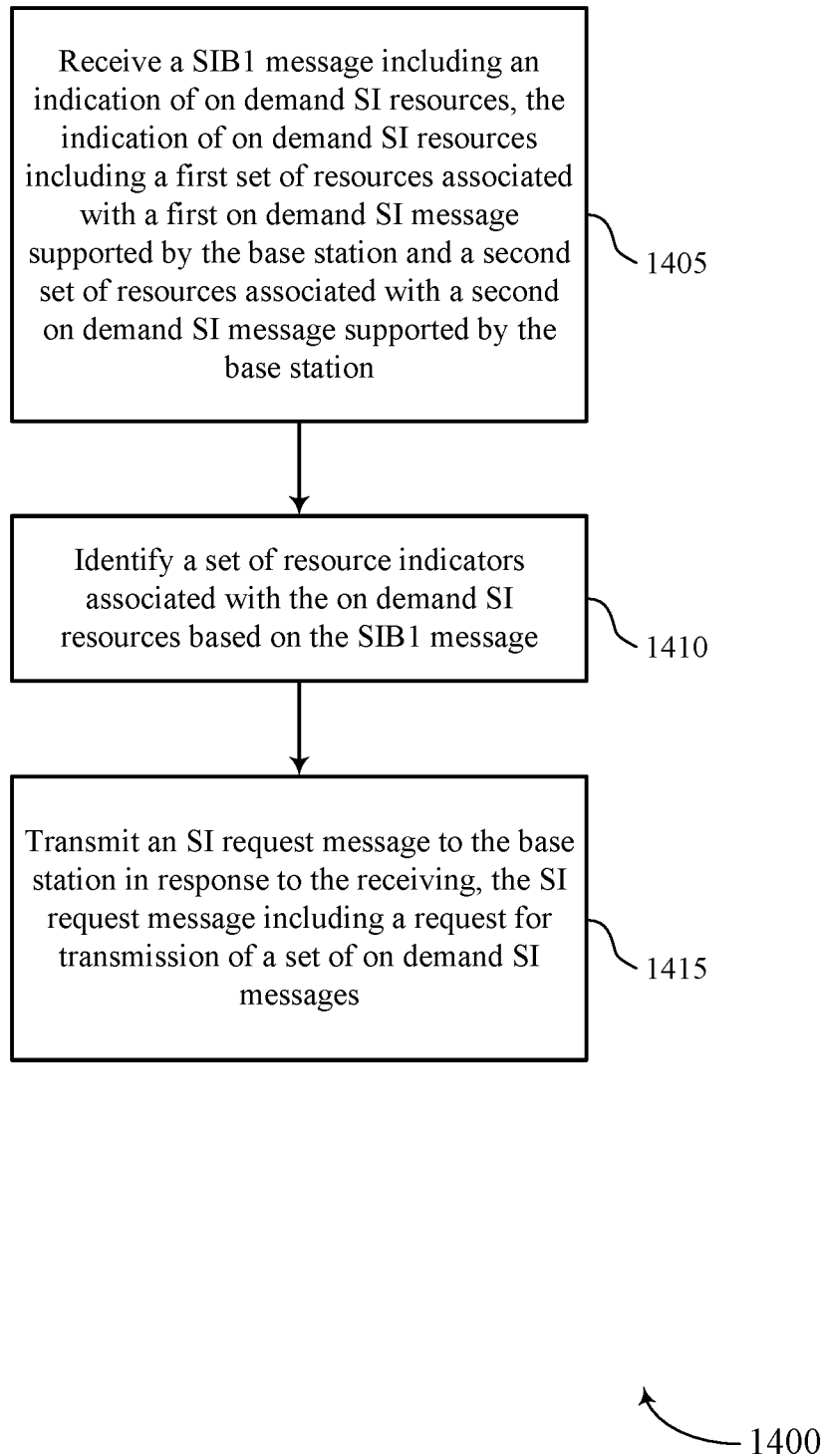

FIG. 14 shows a flowchart illustrating a method 1400 that supports on demand SI triggering in accordance with aspects of the present disclosure. The operations of method 1400 may be implemented by a UE 115 or its components as described herein. For example, the operations of method 1400 may be performed by a on demand SI manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1405, the UE may receive a SIB1 message including an indication of on demand SI resources, the indication of on demand SI resources including a first set of resources associated with a first on demand SI message supported by the base station and a second set of resources associated with a second on demand SI message supported by the base station. The operations of 1405 may be performed according to the methods described herein. In some examples, aspects of the operations of 1405 may be performed by a SIB1 manager as described with reference to FIGS. 4 through 7.

At 1410, the UE may identify a set of resource indicators associated with the on demand SI resources based on the SIB1 message. The operations of 1410 may be performed according to the methods described herein. In some examples, aspects of the operations of 1410 may be performed by a resource indicator component as described with reference to FIGS. 4 through 7.

At 1415, the UE may transmit an SI request message to the base station in response to the receiving, the SI request message including a request for transmission of a set of on demand SI messages. The operations of 1415 may be performed according to the methods described herein. In some examples, aspects of the operations of 1415 may be performed by a request component as described with reference to FIGS. 4 through 7.

Figure 15:
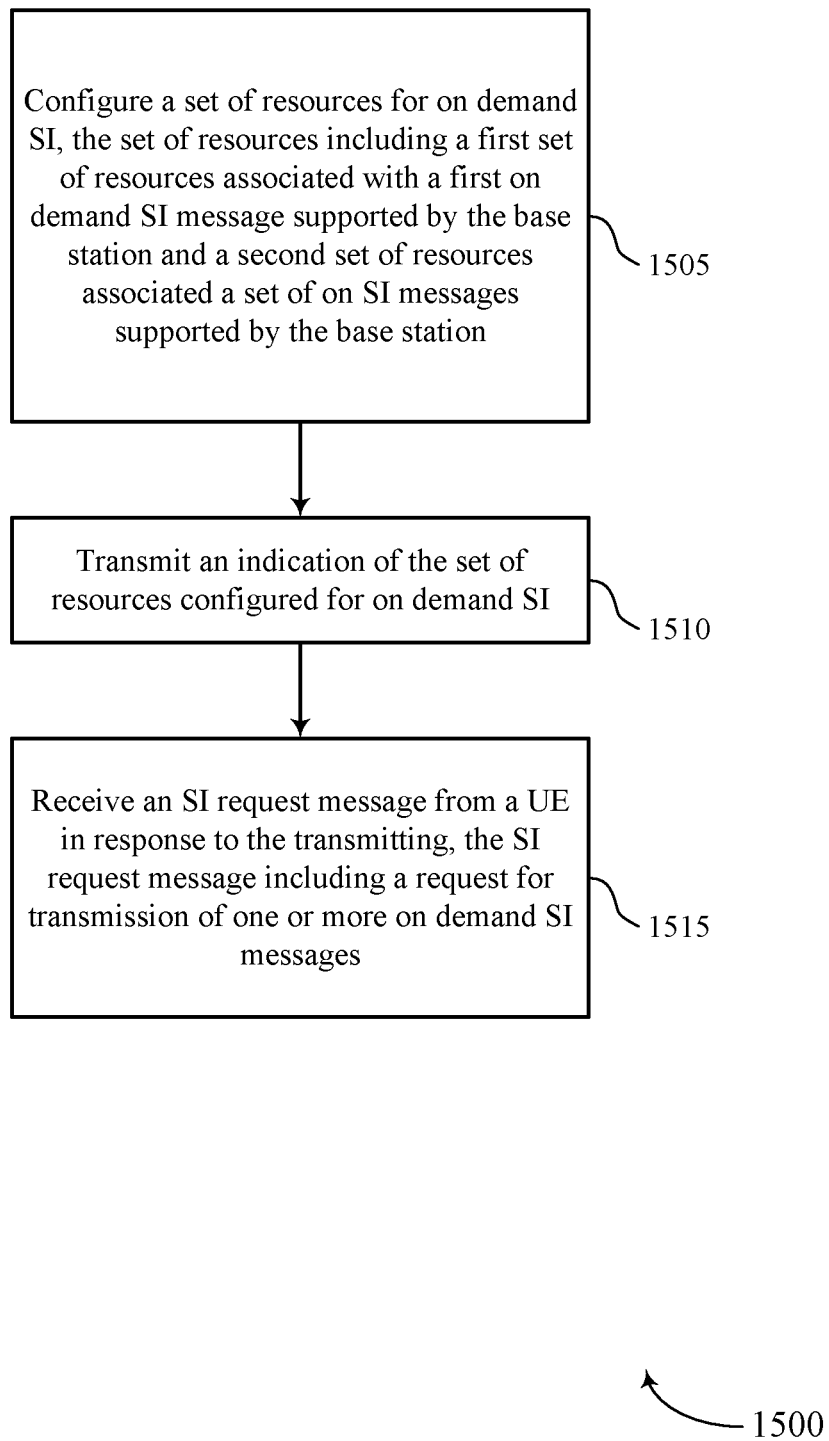

FIG. 15 shows a flowchart illustrating a method 1500 that supports on demand SI triggering in accordance with aspects of the present disclosure. The operations of method 1500 may be implemented by a base station 105 or its components as described herein. For example, the operations of method 1500 may be performed by a on demand SI manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1505, the base station may configure a set of resources for on demand SI, the set of resources including a first set of resources associated with a first on demand SI message supported by the base station and a second set of resources associated a set of on demand SI messages supported by the base station. The operations of 1505 may be performed according to the methods described herein. In some examples, aspects of the operations of 1505 may be performed by a configuration manager as described with reference to FIGS. 8 through 11.

At 1510, the base station may transmit an indication of the set of resources configured for on demand SI. The operations of 1510 may be performed according to the methods described herein. In some examples, aspects of the operations of 1510 may be performed by an indication transmitter as described with reference to FIGS. 8 through 11.

At 1515, the base station may receive an SI request message from a UE in response to the transmitting, the SI request message including a request for transmission of one or more on demand SI messages. The operations of 1515 may be performed according to the methods described herein. In some examples, aspects of the operations of 1515 may be performed by a request receiver as described with reference to FIGS. 8 through 11.

Figure 16:
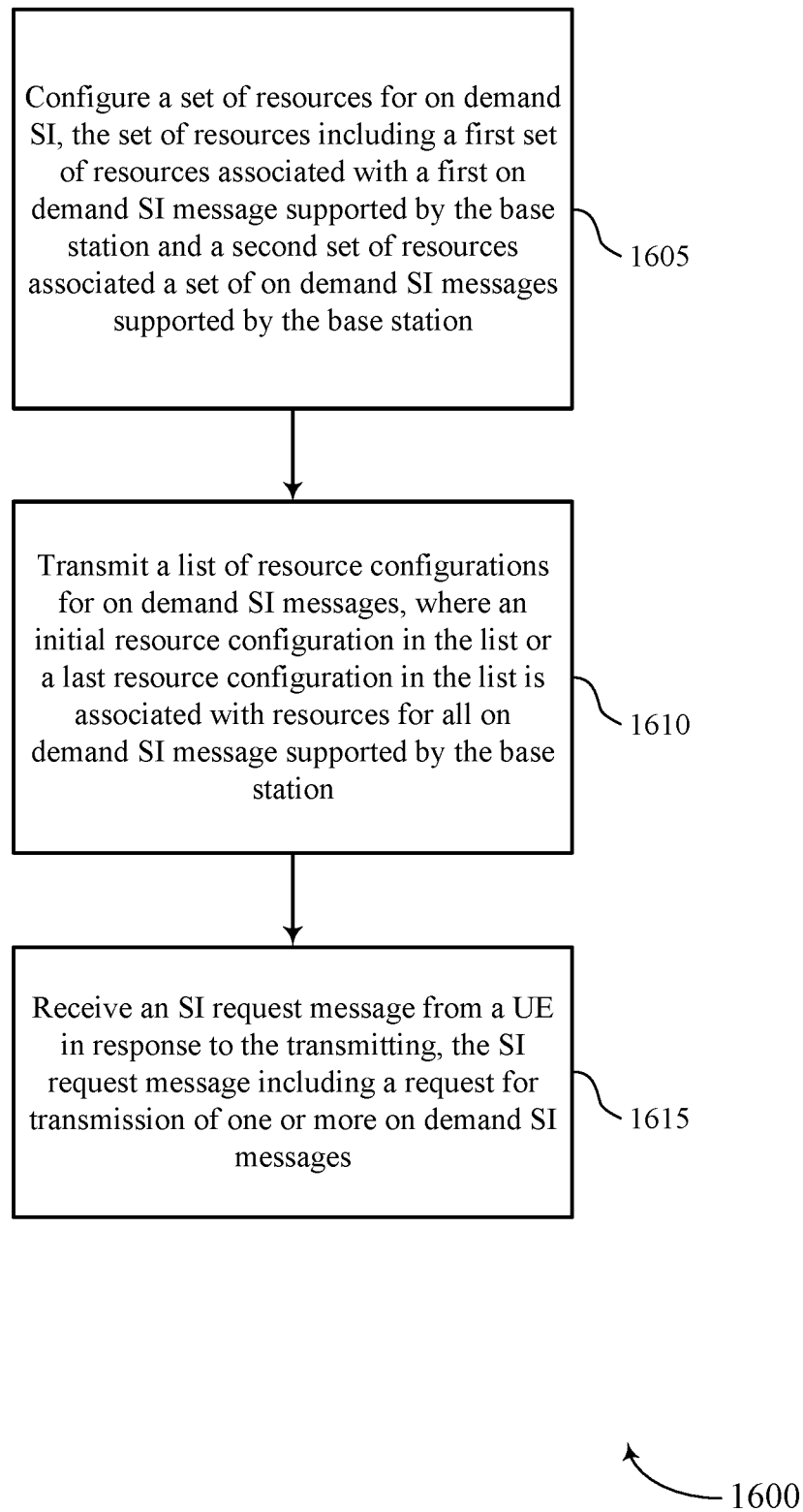

FIG. 16 shows a flowchart illustrating a method 1600 that supports on demand SI triggering in accordance with aspects of the present disclosure. The operations of method 1600 may be implemented by a base station 105 or its components as described herein. For example, the operations of method 1600 may be performed by a on demand SI manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1605, the base station may configure a set of resources for on demand SI, the set of resources including a first set of resources associated with a first on demand SI message supported by the base station and a second set of resources associated a set of on demand SI messages supported by the base station. The operations of 1605 may be performed according to the methods described herein. In some examples, aspects of the operations of 1605 may be performed by a configuration manager as described with reference to FIGS. 8 through 11.

At 1610, the base station may transmit a list of resource configurations for on demand SI messages, where an initial resource configuration in the list or a last resource configuration in the list is associated with resources for all on demand SI message supported by the base station. The operations of 1610 may be performed according to the methods described herein. In some examples, aspects of the operations of 1610 may be performed by a list component as described with reference to FIGS. 8 through 11.

At 1615, the base station may receive an SI request message from a UE in response to the transmitting, the SI request message including a request for transmission of one or more on demand SI messages. The operations of 1615 may be performed according to the methods described herein. In some examples, aspects of the operations of 1615 may be performed by a request receiver as described with reference to FIGS. 8 through 11.

Figure 17:
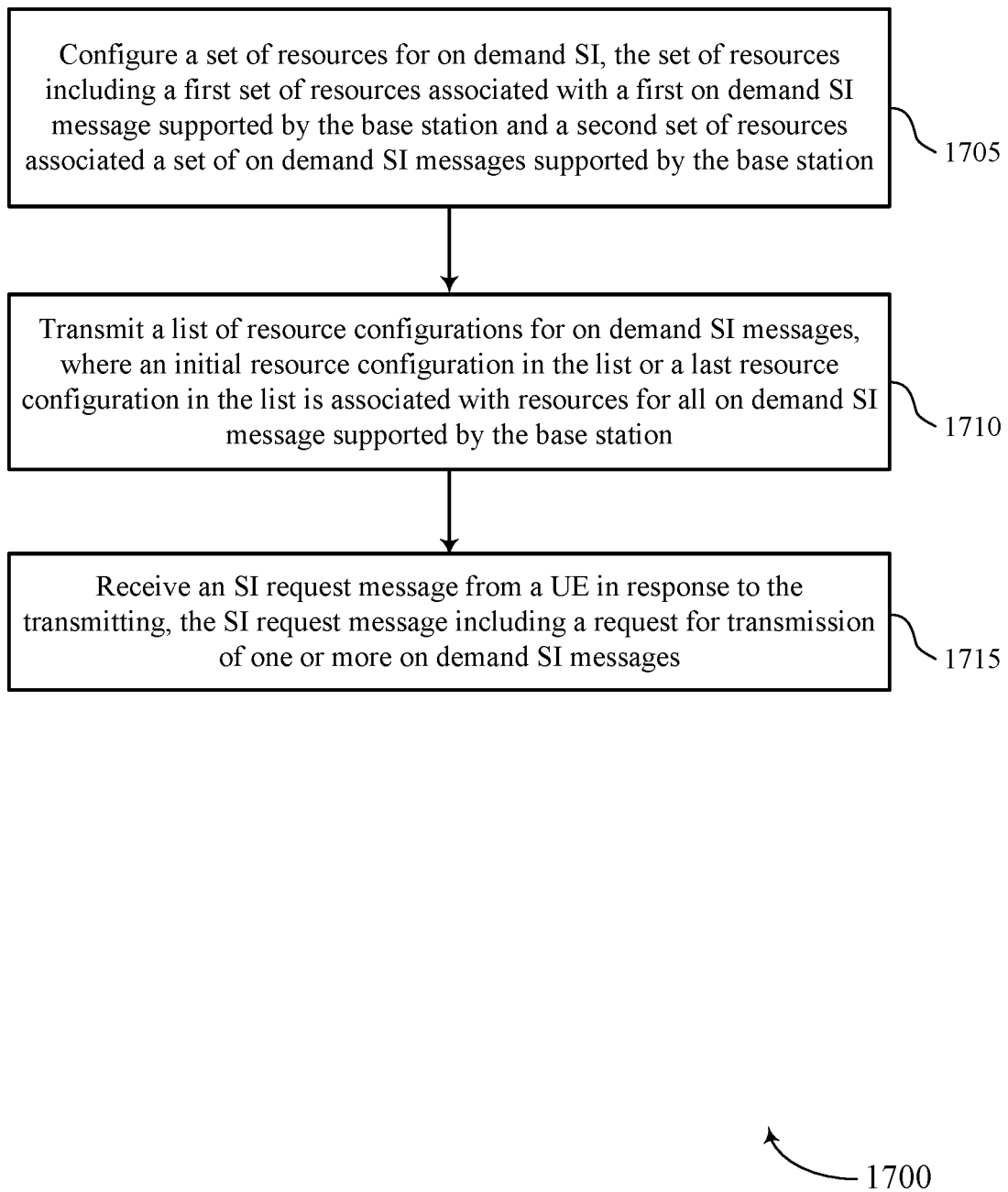

FIG. 17 shows a flowchart illustrating a method 1700 that supports on demand SI triggering in accordance with aspects of the present disclosure. The operations of method 1700 may be implemented by a base station 105 or its components as described herein. For example, the operations of method 1700 may be performed by a on demand SI manager as described with reference to FIGS. 8 through 11. In some examples, a base station may execute a set of instructions to control the functional elements of the base station to perform the functions described herein. Additionally or alternatively, a base station may perform aspects of the functions described herein using special-purpose hardware.

At 1705, the base station may configure a set of resources for on demand SI, the set of resources including a first set of resources associated with a first on demand SI message supported by the base station and a second set of resources associated a set of on demand SI messages supported by the base station. The operations of 1705 may be performed according to the methods described herein. In some examples, aspects of the operations of 1705 may be performed by a configuration manager as described with reference to FIGS. 8 through 11.

At 1710, the base station may transmit a list of resource configurations for on demand SI messages, where an initial resource configuration in the list or a last resource configuration in the list is associated with resources for all on demand SI message supported by the base station. The operations of 1710 may be performed according to the methods described herein. In some examples, aspects of the operations of 1710 may be performed by a list component as described with reference to FIGS. 8 through 11.

At 1715, the base station may receive an SI request message from a UE in response to the transmitting, the SI request message including a request for transmission of one or more on demand SI messages. The operations of 1715 may be performed according to the methods described herein. In some examples, aspects of the operations of 1715 may be performed by a request receiver as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal FDMA (OFDMA), single carrier FDMA (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving, from a base station, an indication of on demand system information resources comprising a first set of resources associated with a first on demand system information message supported by the base station and a second set of resources associated with a second on demand system information message supported by the base station, wherein the indication of the on demand system information resources comprises a plurality of resource configurations for on demand system information messages; and
    transmitting, in response to receiving the indication, a system information request message to the base station according to a resource configuration of the plurality of resource configurations based at least in part on a number of the plurality of resource configurations exceeding a first threshold, the system information request message comprising a request for transmission of a plurality of on demand system information messages.

2. The method of claim 1, further comprising:
    identifying a number of sets of resources associated with on demand system information based at least in part on the indication of on demand system information resources; and
    transmitting the system information request message via a random access message 3 based at least in part on the number of sets of resources exceeding a second threshold.

3. The method of claim 1, further comprising:
    transmitting the system information request message via a random access message 3, wherein the system information request message comprises a request for transmission of all on demand system information messages.

4. The method of claim 1, further comprising:
    transmitting the system information request message via a random access message 3, wherein the system information request message comprises a bitmap indicating the plurality of on demand system information messages.

5. The method of claim 1, wherein the indication of on demand system information resources comprises a list comprising the plurality of resource configurations.

6. The method of claim 5, further comprising:
    determining that a number of resource configurations in the list exceeds the first threshold; and
    transmitting the system information request message comprising a request for all on demand system information messages according to an initial resource configuration in the list.

7. The method of claim 5, further comprising:
    determining that a number of resource configurations in the list exceeds the first threshold; and
    transmitting the system information request message comprising a request for all on demand system information messages according to a last resource configuration in the list.

8. The method of claim 1, further comprising:
    transmitting the system information request message via a random access message 1.

9. The method of claim 1, wherein receiving the indication of on demand system information resources comprises:
    receiving a system information block 1 (SIB1) message comprising the indication of on demand system information resources.

10. The method of claim 9, further comprising:
    receiving system information scheduling information via the SIB1 message, wherein the indication of on demand system information resources is conveyed via the system information scheduling information.

11. The method of claim 9, further comprising:
    identifying a set of resource indicators associated with the on demand system information resources based at least in part on the SIB1 message.

12. The method of claim 11, wherein each of the set of resource indicators corresponds to a respective on demand system information message supported by the base station or multiple or all system information messages.

13. The method of claim 11, wherein an initial resource indicator or a last resource indicator or a configured subset of resource indicators of the set of resource indicators corresponds to all on demand system information messages supported by the base station.

14. The method of claim 11, wherein an initial resource indicator or a last resource indicator or a configured subset of resource indicators of the set of resource indicators corresponds to the second set of resources.

15. The method of claim 11, further comprising:
    transmitting the system information request message via any available resources associated with the set of resource indicators.

16. The method of claim 11, wherein:
a first resource indicator of the set of resource indicators corresponds to a first subset of on demand system information messages supported by the base station; and
a second resource indicator of the set of resource indicators corresponds to a second subset of on demand system information messages supported by the base station.

17. The method of claim 1, wherein the plurality of on demand system information messages comprises all on demand system information messages supported by the base station including the first and second on demand system information messages.

18. The method of claim 1, wherein the system information request message is transmitted via the first set of resources, the second set of resources, or a third set of resources different from the first and second sets of resources.

19. The method of claim 1, wherein the first and second sets of resources comprise random access resources.

20. The method of claim 1, wherein the first and second sets of resources exclude random access resources.

21. An apparatus for wireless communications at a user equipment (UE), comprising: a processor, memory in electronic communication with the processor; and instructions stored in the memory and executable by the processor to cause the apparatus to:
receive, from a base station, an indication of on demand system information resources comprising a first set of resources associated with a first on demand system information message supported by the base station and a second set of resources associated with a second on demand system information message supported by the base station, wherein the indication of the on demand system information resources comprises a plurality of resource configurations for on demand system information messages; and
transmit, in response to receiving the indication, a system information request message to the base station according to a resource configuration of the plurality of resource configurations based at least in part on a number of the plurality of resource configurations exceeding a first threshold, the system information request message comprising a request for transmission of a plurality of on demand system information messages.

22. The apparatus of claim 21, wherein the instructions are further executable by the processor to cause the apparatus to:
identify a number of sets of resources associated with on demand system information based at least in part on the indication of on demand system information resources; and
transmit the system information request message via a random access message 3 based at least in part on the number of sets of resources exceeding a second threshold.

23. The apparatus of claim 21, wherein the instructions are further executable by the processor to cause the apparatus to:
transmit the system information request message via a random access message 3, wherein the system information request message comprises a request for transmission of all on demand system information messages.

24. The apparatus of claim 21, wherein the instructions are further executable by the processor to cause the apparatus to:
transmit the system information request message via a random access message 3, wherein the system information request message comprises a bitmap indicating the plurality of on demand system information messages.

25. The apparatus of claim 21, wherein the indication of on demand system information resources comprises a list comprising the plurality of resource configurations for on demand system information messages.

26. The apparatus of claim 21, wherein the instructions are further executable by the processor to cause the apparatus to:
transmit the system information request message via a random access message 1.

27. The apparatus of claim 21, wherein the instructions to receive the indication of on demand system information resources are executable by the processor to cause the apparatus to:
receive a system information block 1 (SIB1) message comprising the indication of on demand system information resources.

28. The apparatus of claim 21, wherein the plurality of on demand system information messages comprises all on demand system information messages supported by the base station including the first and second on demand system information messages.

29. An apparatus for wireless communications at a user equipment (UE), comprising:
means for receiving, from a base station, an indication of on demand system information resources comprising a first set of resources associated with a first on demand system information message supported by the base station and a second set of resources associated with a second on demand system information message supported by the base station, wherein the indication of the on demand system information resources comprises a plurality of resource configurations for on demand system information messages; and
means for transmitting, in response to receiving the indication, a system information request message to the base station according to a resource configuration of the plurality of resource configurations based at least in part on a number of the plurality of resource configurations exceeding a threshold, the system information request message comprising a request for transmission of a plurality of on demand system information messages.

30. A non-transitory computer-readable medium storing code for wireless communications at a user equipment (UE), the code comprising instructions executable by a processor to:
receive, from a base station, an indication of on demand system information resources comprising a first set of resources associated with a first on demand system information message supported by the base station and a second set of resources associated with a second on demand system information message supported by the base station, wherein the indication of the on demand system information resources comprises a plurality of resource configurations for on demand system information messages; and
transmit, in response to receiving the indication, a system information request message to the base station according to a resource configuration of the plurality of resource configurations based at least in part on a number of the plurality of resource configurations exceeding a threshold, the system information request message comprising a request for transmission of a plurality of on demand system information messages.

* * * * *